US010083303B2

(12) United States Patent
Vedula et al.

(10) Patent No.: US 10,083,303 B2
(45) Date of Patent: Sep. 25, 2018

(54) SYSTEM, METHOD AND COMPUTER-ACCESSIBLE MEDIUM FOR SECURITY VERIFICATION OF THIRD PARTY INTELLECTUAL PROPERTY CORES

(71) Applicant: New York University, New York, NY (US)

(72) Inventors: Vivekananda Vedula, Austin, TX (US); Jeyavijayan Rajendran, Dallas, TX (US); Arunshankar Dhandayuthapany, New York, NY (US); Ramesh Karri, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 14/958,585

(22) Filed: Dec. 3, 2015

(65) Prior Publication Data

US 2016/0098565 A1 Apr. 7, 2016

Related U.S. Application Data

(63) Continuation-in-part of application No. 14/874,794, filed on Oct. 5, 2015.

(60) Provisional application No. 62/235,890, filed on Oct. 1, 2015, provisional application No. 62/059,373, filed on Oct. 3, 2014, provisional application No. 62/087,072, filed on Dec. 3, 2014.

(51) Int. Cl.
| | |
|---|---|
| *G06F 21/57* | (2013.01) |
| *G06F 21/56* | (2013.01) |
| *G06F 21/76* | (2013.01) |

(52) U.S. Cl.
CPC ........... *G06F 21/577* (2013.01); *G06F 21/56* (2013.01); *G06F 21/76* (2013.01)

(58) Field of Classification Search
None
See application file for complete search history.

(56) References Cited

U.S. PATENT DOCUMENTS

| | | | | |
|---|---|---|---|---|
| 6,430,561 | B1* | 8/2002 | Austel | G06F 21/6218 |
| 7,596,770 | B1* | 9/2009 | Kuehlmann | G06F 17/5031 |
| | | | | 716/106 |
| 2005/0120065 | A1* | 6/2005 | Dirscherl | G06F 7/582 |
| | | | | 708/250 |

(Continued)

OTHER PUBLICATIONS

X. Zhang and M. Tehranipoor. 2011a. Case study: Detecting hardware Trojans in third-party digital IP cores. In Proceedings of the 2011 IEEE International Symposium on Hardware-Oriented Security and Trust (HOST'11). 67-70. DOI:http://dx.doi.org/10.1109/HST.2011.5954998.*

(Continued)

*Primary Examiner* — Michael R Vaughan
(74) *Attorney, Agent, or Firm* — Hunton Andrews Kurth LLP

(57) ABSTRACT

An exemplary system, method and computer-accessible medium for detecting the presence of a Trojan(s) in a circuit(s), can include, for example, receiving information related to a property(s) configured to determine the presence of the Trojan(s), and determining the presence of the Trojan(s) based on the property(s) and a design(s) of the circuit(s) using a bounded model checking tool.

30 Claims, 8 Drawing Sheets

(56) References Cited

U.S. PATENT DOCUMENTS

2011/0106866 A1* 5/2011 Grayson ............... H04L 63/10
708/200

OTHER PUBLICATIONS

D. Kroening, E. Clarke, and K. Yorav. Behavioral consistency of C and Verilog programs using bounded model checking. In Proceedings of DAC 2003, pp. 368-371. ACM Press, 2003.*

Clarke E, Biere A, Raimi R, Zhu Y (2001) Bounded model checking using satisfiability solving. Formal Methods Syst Des 19(1):7-34.*

S. Jha and S. K. Jha "Randomization based probabilistic approach to detect Trojan circuits" Proc. HASE, pp. 117-124, 2008, Nanjing, China.*

"Defense Science Board (DSB) study on High Performance Microchip Supply," http://www.acq.osd.mil/dsb/reports/ADA435563.pdf, 2005.

Bhunia et al., "Hardware Trojan Attacks: Threat Analysis and Countermeasures," Proceedings of the IEEE, vol. 102, No. 8, pp. 1229-1247, 2014.

M. Tehranipoor et al., "A Survey of Hardware Trojan Taxonomy and Detection," IEEE Design and Test of Computers, vol. 27, No. 1, pp. 10-25, 2010.

Wikipedia, "Trustworthy computing." [Online]. Available: http://en.wikipedia.org/wiki/Trustworthy_computing#cite_note-0.

X. Zhang et al., "Case study: Detecting hardware Trojans . . . ," in the Proc. of IEEE International Symposium on Hardware-Oriented Security and Trust, pp. 67-70, 2011.

J. Jou et al., "Coverage analysis techniques for HDL design validation," IEEE Asia Pacific Conference on Chip Design Languages, 1999.

A. Waksman et al., "FANCI: Identification of Stealthy Malicious . . . ," ACM Conference on Computer & Communications Security, pp. 697-708, 2013.

H. Salmani et al, "Analyzing circuit vulnerability . . . ," IEEE International Symposium on Defect & Fault Tolerance in VLSI and Nanotechnology Systems, pp. 190-195, 2013.

N. G. Tsoutsos et al., "Advanced Techniques for Designing Stealthy Hardware Trojans," IEEEIACM Design Automation Conference, pp. 1-4, 2014.

M. R. Rudra et al., "Designing Stealthy Trojans with . . . ," in the Proc. of the IEEE/ACM Design Automation Conference, pp. 172:1-172:4, 2014.

E. Love et al., "Proof-Carrying Hardware intellectual Property . . . ," IEEE Transactions on Information Forensics and Security, vol. 7, No. 1, pp. 25-40, 2012.

"NYU-Embedded Systems Challenge," http://isis.poly.edu/esc/.

Y. Liu et al., "Hardware Trojans in wireless crypto-graphic ICs . . . ," IEEE/ACM International Conference on Computer-Aided Design, pp. 399-404, 2013.

L. Lin et al, "MOLES: Malicious off-chip leakage enabled by side-channels," IEEE/ACM International Conference on Computer-Aided Design, pp. 117-122, 2009.

J. Woodcock et al., "Formal Methods: Practice and Experience," ACM Computing Surveys, vol. 41, No. 4, pp. 19:1-19:36, 2009.

A. Pnucli, "The temporal semantics of concurrent programs," in Semantics of Concurrent Computation, ser. Lecture Notes in Computer Science,1979, vol. 70, pp. 1-20.

L. Lampert, "Proving the Correctness of Multiprocess Programs," IEEE Transactions on Software Engineering, vol. SE-3, No. 2, pp. 125-143, 1977.

K. L. McMillan, Symbolic Model Checking. Kluwer Academic Publishers, 1993.

E. Clarke et al., "Another Look at I TL Model Checking," Formal Methods in System Design, vol. 10, No. 1, pp. 47-71, 1997.

A. Biere et al., "Symbolic Model Checking without BDDs," Tools and Algoritluns,jbr the Construction and Analysis of Systems, vol. 1579, pp. 193-207, 1999.

L. Feiten et al, "#SAT-based vulnerability analysis of . . . ," IEEE International Symposium on Defect and Fault Tolerance in VLSI and Nanotechnology Systems, pp. 49-54, 2012.

H. Eldib.,"SMT-Based Verification of Software Countermeasures . . . ,"International Conference on Tools and Algorithms for the Construction and Analysis of Systems, pp. 62-77, 2014.

M. M. Matalgah et al., "Alleviating the effect of the strict avalanche criterion (sac) of symmetric-key encryption in . . . ," pp. 138-141, Mar. 2011.

"Cadence: Smv," http://www.cadence.com/products/fv/pages/default.aspx, 2005.

J. Zhang et al., "VeriTrust: Verification for hardware trust," IEEE/ACM Design Automation Conference, pp. 1-8, 2013.

J. Zhang et al., "DeTrust: Defeating Hardware Trust Verification with Stealthy . . . " ACM Conference on Computer and Communications Security, pp. 153-166, 2014.

Y. Jin et al, "Proof carrying-based information flow tracking for data secrecy protection and hardware trust," IEEE VLSI Test Symposium, pp. 252-257, 2012.

Y. Jin et al.,"A proof-carrying based framework for trusted microprocessor IP," IEEE/ACM International Conference on Computer-Aided Design, pp. 824-829, 2013.

A. Waksman et al., "Silencing Hardware Backdoors," IEEE Symposium on Security and Privacy, pp. 49-63, 2011.

V. Boppana et al., "Model Checking Based on Sequential ATPG," Computer Aided Verification, vol. 1633, pp. 418-430, 1999.

Synopsys, "Tetramax ATPD," http://www.synopsys.com/Tools/Implementation/RTLSynthesis/Test/Pages/TetraMAXATPG.aspx, 2014.

Microchip Technology, "PIC16F84A Data sheet," ww1.microchip.com/downloads/en/DeviceDoc/35007b.pdf , 2001.

M. Prasad et al., "Why is ATPG easy?" IEEE/ACM Design Automation Conference, pp. 22-28, 1999.

* cited by examiner

SYSTEM, METHOD AND COMPUTER-ACCESSIBLE MEDIUM FOR SECURITY VERIFICATION OF THIRD PARTY INTELLECTUAL PROPERTY CORES

CROSS-REFERENCE TO RELATED APPLICATION(S)

This application is a continuation-in-part of U.S. patent application Ser. No. 14/874,794, filed on Oct. 5, 2015, which relates to and claims priority from U.S. Patent Application Nos. 62/059,373, filed on Oct. 3, 3014, and 62/235,890, filed on Oct. 1, 2015. This application also relates to and claims priority from U.S. Patent Application No. 62/087,072, filed on Dec. 3, 2014. The entire disclosures of the above applications are incorporated herein by reference in their entireties.

FIELD OF THE DISCLOSURE

The present disclosure relates generally to the verification(s) of third party intellectual property ("IP") ("3PIP"), and more specifically, to exemplary embodiments of an exemplary system, method and computer-accessible medium for security verification of $3^{rd}$ party intellectual property cores.

BACKGROUND INFORMATION

Fabless System-on-a-Chip ("SoC") designers combine (3PIP) cores with in-house to design SOCs. They then outsource the fabrication and test phases of the SOCs. 3PIP vendors, foundries and test companies are distributed throughout the world. A SoC designer can use their service to meet the tight time-to-market deadlines, and to reduce the design, fabrication and test costs.

Notwithstanding its benefits, globalization of the SoC design flow has created opportunities for rogue elements within the supply chain to corrupt the integrated circuits ("ICs"). (See, e.g., References 1-3). Rogue elements in a foundry can alter a design, or include malicious circuits (e.g., called hardware Trojans), during fabrication. Similarly, rogue elements in the 3PIP companies can insert Trojans into their own IP. The inserted Trojans can be conditionally triggered or always on. (See, e.g., References 2 and 3). When triggered, a Trojan can result in a deadlock or failure of the system (e.g., overt attack), or can create a backdoor facilitating the attacker to gain remote access to the system (e.g., a covert attack). (See, e.g., References 2 and 3).

To provide a trustworthy SoC design, it can be beneficial to ensure the trustworthiness of the 3PIPs. However, since this may not always be possible, the SoC integrator should ensure that all the security vulnerabilities in any of the 3PIPs can be detected, or their effects muted, before they can damage the system.

Since 3PIPs can typically be delivered as Register Transfer Level ("RTL") VHSIC Hardware Description Language ("VHDL")/Verilog codes, code coverage analysis has been used on RTL codes to identify suspicious signals that can potentially be a part of a Trojan. (See, e.g., Reference 5). Since even a 100% coverage of the RTL code in a design does not guarantee that it can be fault-free (see, e.g., Reference 6), there is no guarantee that the 3PIPs can be trustworthy.

In another set of techniques, it has been proposed to analyze the 3PIP code, and mark suspicious signals. (See, e.g., References 7 and 8). The SoC integrator can then manually analyze these signals, and identify any Trojans. This technique, however, may also not guarantee Trojan detection, and can burden the SoC integrator by requiring them to manually identify the Trojans. In such a case, Trojan detection capability can depend on the skill of the SoC integrator. Furthermore, researchers have successfully bypassed this Trojan detection technique. (See, e.g., References 9 and 10). While probability analysis can be used to mark suspicious signals, controllability and reachability metrics can also be used to mark suspicious signals. (See, e.g., References 7 and 8).

Alternately, the SoC integrator, and a 3PIP vendor, can agree on a pre-defined set of security-related properties, and the SoC integrator can check the 3PIP against these properties. (See, e.g., Reference 11). However, a design methodology to develop the security-related properties for a 3PIP can be beneficial.

Thus, it may be beneficial to provide an exemplary system, method and computer-accessible medium for security verification of $3^{rd}$ party intellectual property cores, which can overcome at least some of the deficiencies described herein above.

SUMMARY OF EXEMPLARY EMBODIMENTS

Exemplary system, method and computer-accessible medium for detecting the presence of a Trojan(s) in a circuit(s), according to an exemplary embodiment of the present disclosure, can include, for example, a receipt of information related to a property(s) configured to determine the presence of the Trojan(s), and a determination of the presence of the Trojan(s) based on the property(s) and a design(s) of the circuit(s) using a bounded model checking tool. The exemplary design(s) can include a software description of the circuit(s). The determination procedure can include a generation of a Boolean formula(s) using the BMC tool. Particular values can be assigned to the Boolean formula(s) using a satisfiability solving engine. An indication of the presence of the Trojan(s) can be generated if the Boolean formula(s) evaluates to 1 using the particular values.

According to certain exemplary embodiments of the present disclosure, it can be possible to include a bound(s). The determination procedure can be further based on a bound(s), which can be a particular number of clock cycles. The property(s) can include a detection that Trojan(s) can leak a secret(s). The property(s) can also include a detection that the Trojan(s) can leak a subset(s) of the secret(s). The property(s) can further include a detection that the Trojan(s) can be triggered over a plurality of clock cycles, or a direct polarity(s) and an indirect polarity(s).

In some exemplary embodiments of the present disclosure, assignments to an input of the configuration over a plurality of clock cycles can be determined using the property(ies). The determination procedure can be based a set of inputs over the clock cycles that violate the property(ies). The property(ies) can be or include a strict avalanche criterion property. The strict avalanche criterion property can be determined, for example, using at least two seeds for a pseudo random number generator.

In further exemplary embodiments of the present disclosure, a plurality of states that satisfy the property(ies) can be generated using the bounded model checking engine, which can be used to determine the presence of the Trojan(s). A witness(s) that violates the property can be generated using the bounded model checking engine, which can also be used to determine the presence of the Trojan(s). A temporal logic design of the at least one configuration can be generated using the bounded model checking engine. The presence of the Trojan(s) can be further determined based on the temporal logic design(s).

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
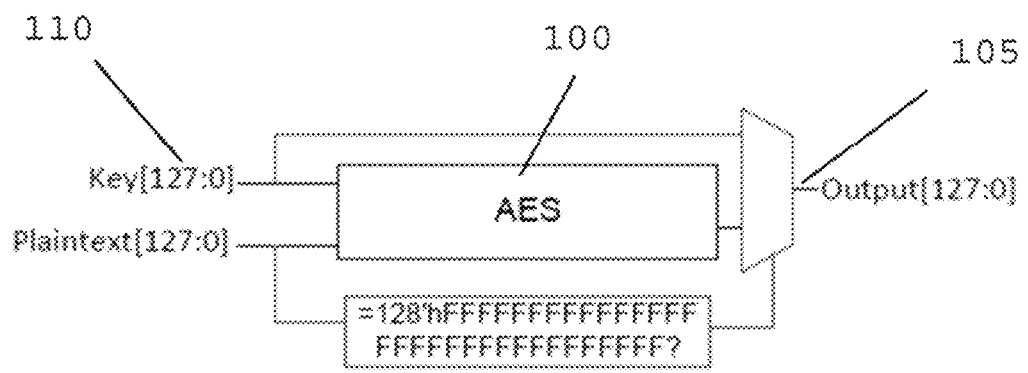
FIG. 1 is an exemplary schematic diagram of an exemplary Advanced Encryption Standard ("AES") design with a hardware Trojan according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures, when taken in conjunction with the appended claims.

DETAILED DESCRIPTION OF EXEMPLARY EMBODIMENTS

The exemplary system, method and computer-accessible medium, according to an exemplary embodiment of the present disclosure, to detect malicious or undesirable circuits, gates or properties (e.g., a Trojan) in 3PIP using assertions. Specifically, Trojans that leak secret information (e.g., cryptographic key, plaintext or intermediate computation) from the IP can be targeted.

Model checking can be used to detect Trojans. The input to the exemplary model checker can be the target property, and a formal description of the design in temporal logic, which can be a representation of the design as sequence of states. The output of the exemplary model checker can be a set of states which can satisfy the given property, or a witness of a sequence which can violate the property.

In the exemplary detect mechanism, the target property can be provided such that the design should not leak any confidential information. If the exemplary design violates this property, it can be classified as infected with a Trojan; otherwise, can be classified as Trojan-free. In addition to identifying Trojan-infected designs, the exemplary system, method and computer-accessible medium can generate the witness (e.g., set of inputs over several clock cycles) that can trigger the malicious behavior. The SoC integrator can use this witness in case of a dispute and to expose the Trojan.

Exemplary advantages of the exemplary system, method and computer-accessible medium can include, for example:
  i) use with any cryptographic procedure;
  ii) not burdening the SoC integrator by having them manually analyzing the code;
  iii) substantially guaranteeing detection of Trojans, if the IP code has Trojans. If not, the exemplary system, method and computer-accessible medium can conclude that the design can be Trojan-free;
  iv) use in conjunction with property-based Trojan detection procedures (see e.g., Reference 11); and/or
  v) generation of the trigger condition for the Trojan.

Exemplary Threat Model

The SoC designer can buy, or otherwise obtain, IP from the 3PIP vendors for a SoC design to meet the time-to-market constraints and reduce the design effort. The 3PIP vendor can deliver the IP in an RTL netlist form or a gate-level netlist form. The 3PIP vendor can be the attacker, and the SoC integrator can be the defender.

An exemplary objective of the attacker can be to subvert the security of the SoC design, which can be using the IP. For this purpose the attacker can introduce hardware Trojans into the IP. A 3PIP designer can insert Trojans whose triggers and payload characteristics can be "digital." For example, the characteristics of the Trojans do not depend on any physical characteristics of the SoC design such as power and timing. This can be because the attacker (e.g., 3PIP vendor) has little or no control over the synthesis constraints of the SoC designer. Thus, the attacker cannot design a Trojan that depends on the physical characteristics of the SoC design as these characteristics can be determined by the synthesis constraints. Since the SoC synthesis does not alter the digital functionality of the 3PIP, an attacker can use a Trojan whose trigger and payload characteristics can be digital. Note that this assumption can be consistent with the other 3PIP Trojan detection procedures.

An exemplary objective of the defender can be to detect Trojans; if there can be any, in the 3PIP. If there are no Trojans in the 3PIP, the defender should be able to conclude that the 3PIP can be Trojan-free. It can be assumed that the defender has access to the RTL/gate-level netlist of the 3PIP since they are buying the 3PIP. Thus, the defender can run functional simulations on this 3PIP and/or can subject it to functional verification. Furthermore, the defender can know the functionality of the input and output ports of the 3PIP as specified in the specification. For example, consider a 3PIP implementing a cryptographic encryption procedure. The defender can know the input port where the plaintext has to be applied, and the input port where the secret key has to be applied.

Exemplary Trojans in Cryptographic ICs

Since no single Trojan detection procedure can guarantee detection of all Trojans (see, e.g., References 2 and 3), researchers usually design procedures that target a specific class of Trojans. Trojans in cryptographic ICs can be considered because, for example:

i) many researchers have successfully demonstrated this class of Trojans (see, e.g., References 14-16);
ii) most of the Trojans are in the Trust-Hub Trojan repository (see, e.g., Reference 12);
iii) Trojans that modify functionality or deny service can be detected by concurrent error detection ("CED") procedures. However, CED procedures may not detect leakage of information; and
iv) most of the SoC designs can be equipped with cryptographic modules to speed-up computation. (See, e.g., References 17 and 18).

For example, Trojans that leak secret information can be considered; the secret information can be plaintext, secret key or any of the intermediate computations.

Exemplary Methods in Hardware Design

Ensuring the correct functionality of a complex hardware design can be a complex process. While simulation-based testing methods remain the primary way to validate the hardware design, its effectiveness in assuring production-level quality can be severely limited. Formal methods (see, e.g., Reference 19), have emerged as an alternate approach to ensure that the safety-critical components of the design can be exhaustively tested for correctness. These exemplary methods include application of mathematical approaches to specify the quality criteria and to validate the design against this criterion.

Quality criteria can be specified using properties described in temporal logic and variations, following work in verifying reactive programs. (See, e.g., Reference 20). Exemplary properties which can express system behavior can be classified as safety and liveness properties. (See, e.g., Reference 21). A safety property can express the fact that "something bad will never happen." A liveness property can express the behavior whereby "something good will eventually happen."

In Linear Time temporal logic ("LTL"), the notion of time can be that of a linearly ordered set (e.g., this can be thought of as a possible sequence of states). One of the operators used to describe LTL properties in dealing with hardware verification can be Gq. It can express that q can be true at every moment of the future.

Exemplary Bounded Model Checking

The process of analyzing a design for the validity of properties stated in temporal logic can be called model checking. The input to a model checker can be a formal description of the design in temporal logic, and the result can be a set of states which can satisfy the given property, or a witness of a sequence which can violate the property.

Efficient Procedures have been developed to manipulate Boolean formulas in model checking using Ordered Binary Decision Diagrams ("OBDD"s). (See, e.g., Reference 22). It has also been illustrated that LTL model checking can be reduced to computational tree logic ("CTL") model checking with fairness constraints. (See, e.g., Reference 23). The use of OBDDs can facilitate the analysis of designs without explicitly enumerating their states. However, OBDDs can also be vulnerable to the state explosion problem for even moderately complex designs.

In practice, designers can know the bounds on the number of steps within which a property should hold. This can lead to Bounded Model Checking ("BMC"), where the property, can be determined to hold within a finite sequence of state transitions. In this exemplary approach (see, e.g., Reference 24), a Boolean formula can be derived from the property, and the design under verification ("DUV") can be satisfiable if and only if the underlying state transition system can realize a finite sequence of state transitions that can reach certain states of interest. The exemplary Boolean formula that can be formed can be given to a satisfiability solving ("SAT") engine, and if a satisfying assignment can be found, that assignment can be a witness for the path segment of interest. If such an assignment cannot be found at a given length k, the search can be continued for a larger k.

Exemplary Formal Methods in Hardware Security

Previously, verification procedures have been used to detect side-channel attacks. SAT-based procedures can be used to detect fault attacks. (See, e.g., Reference 25). Satisfiability Modulo Theories ("SMT")-based procedures have been used to evaluate the strength of software countermeasures for side-channel attacks. (See, e.g., Reference 26). The detection of the Trojans using property checking has also been proposed. (See, e.g., Reference 11). The exemplary system, method and computer-accessible medium, according to an exemplary embodiment of the present disclosure, can express the searching for a Trojan in the form of a property or an assertion. The property or assertion, and a design of a circuit, can be input into a bounded model checking tool, which can formulate a Boolean formula to be satisfied or proved. A SAT engine can attempt to assign values in the Boolean formula such that the Boolean formula evaluates to 1. This can be used to determine the presence of the Trojan being searched for.

Exemplary Assertion-Based Trojan Detection

Exemplary Trojans that Leak Keys

A Trojan, which leaks a secret information s, can bijectively map s to an output port o∈O, where O can be the list of output ports. In case of crypto designs, s can be the secret key, plaintext or any intermediate computation. In order to detect this Trojan, the exemplary system, method and computer-accessible medium, according to the an exemplary embodiment of the present disclosure, can utilize quality criteria that can be specified as an LTL property, for example, as follows:

$$\forall i \in \mathcal{I} \exists P \models G \neg (s == o)$$

where I can be the set of input ports of the design expressed as a program P. This exemplary property can seek to ensure that for every possible input in the exemplary design, it can be globally true that the secret information may not be equal to any of the output ports.

For example, consider the AES design 100 shown in FIG. 1. The Trojan can leak the secret key through the output 105 when the plaintext can be 128'hFFFFFFFFFFFFFFFFFFFFFFFFFFFFFFFF. Here, the Trojan can bijectively map each bit of key 110 to the corresponding bit of the output.

Exemplary Properties to Detect Trojans

A property can be described as an embedded Verilog assertion. For example:

---

Property 1: Detect Trojans that leak secret.

```
design_under_test instantiation_1{
  •inputs(inputs),
  •secret1(secret),
  •outputs1(outputs) };
```

Property 1: Detect Trojans that leak secret.

```
design_under_test instantiation_2{
    •inputs(inputs),
    •secret2(secret),
    •outputs2(outputs) };
assign secret1 = 1'b0;
assign secret2 = 1'b1;
    assert (!((outputs1 == secret1)
        && (outputs2 == secret2)))
```

Figure 2:
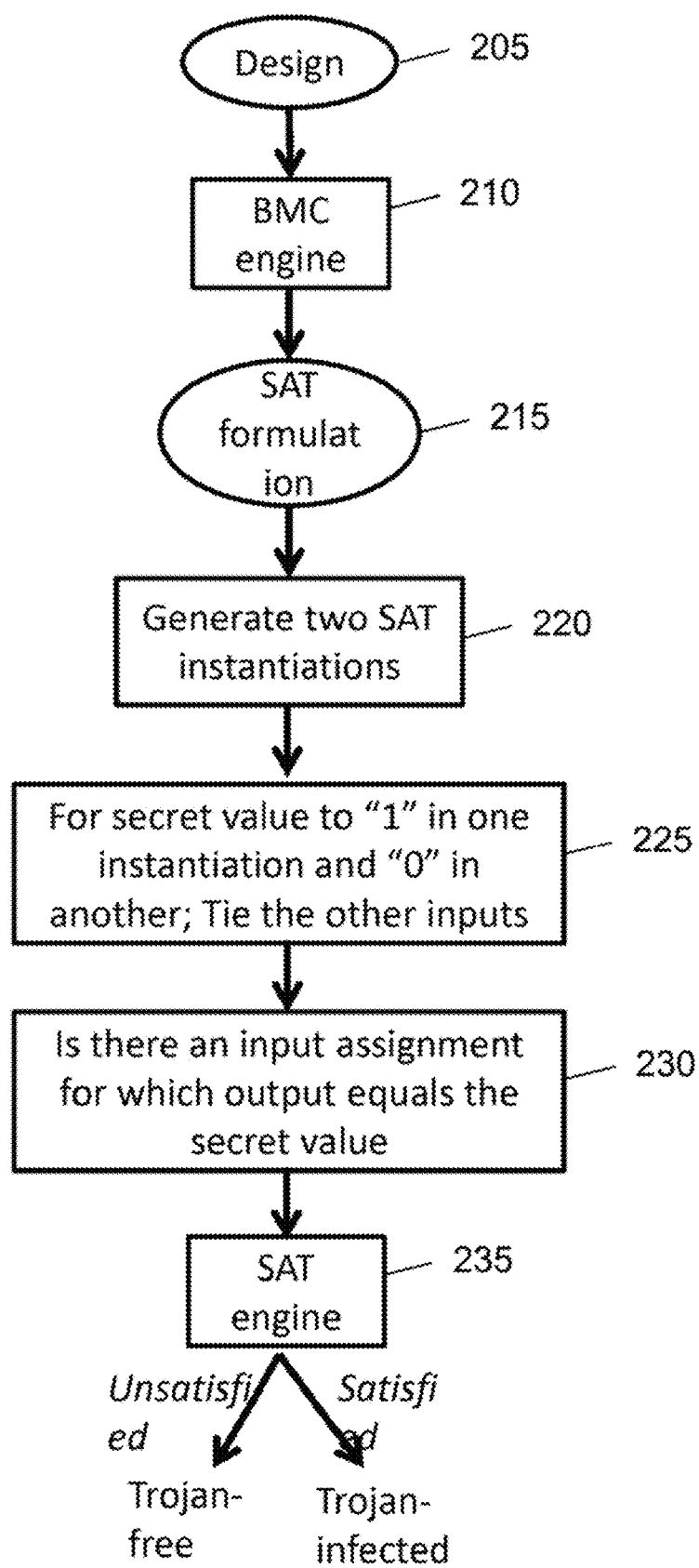
FIG. 2 is an exemplary flow diagram illustrating an exemplary property for determining the presence of a Trojan according to an exemplary embodiment of the present disclosure.

For example, as shown in the flow diagram of FIG. 2, a BMC engine 210 can take the Verilog representation of the design 205 along with Property 1 and can derive a SAT formulation 215 for validating the property. In order to check for bijective mapping, the Trojan leaks the secret can be determined when the secret value of the secret can be either 1 or 0. Two copies of the design under test can be instantiated at procedure 220. The secret values forced to logic can be in one copy, and logic 0s can be in another copy at procedure 225. Furthermore, the other inputs of two copies can be tied together. The SAT engine can look for an input assignment that can bijectively map the secret to the output, irrespective of the secret value at procedure 230. At procedure 235, if there exists an assignment, then the property can declare that there exists a Trojans; otherwise, it can declare that the design does not have a Trojan the leaks the secret key.

Exemplary Trojans that Leak a Subset of Secret Information

While the Trojan shown in FIG. 1 leaks all the 128 bits of the secret key, Trojans can also leak only a subset of key-bits. While Property 1 can be used to detect Trojans that leak only a subset of key-bits, there can exist 2128 about possible subsets, making it computationally infeasible to check for all possible subsets.

The exemplary system, method and computer-accessible medium, according to an exemplary embodiment of the present disclosure, can be used to detect these kinds of Trojans, by using, for example, an assertion for leakage of individual bits of the secret key. Exemplary property 2 indicated below lists the assertion that detects a Trojan that can leak a subset of the secret information. For example, it can check if bit 0 of the secret information can be leaked. All the other bits of the secret information and the inputs can be left unassigned and tied together. This way, the exemplary SAT engine can attempt to find an assignment to an input, and the other bits of the secret that bijectively maps bit 0 of the secret to any of the outputs, irrespective of the value of bit 0. If there exists an assignment, then the property can declare that there exists a Trojans; otherwise, it can declare that the design does not have a Trojan that leaks the secret key.

Property 2. Assertion to detect Trojans that leak a subset (bit 0) of secret.

```
design_under_test instantiation_1{
    •inputs (inputs),
    •secret1(secret),
    •outputs1(outputs) };
design_under_test instantitation_2{
    •inputs(inputs),
    •secret2(secret),
    •outputs2(outputs) };
assign secret1 = secret[:1]& 1'b0;
assign secret2 = secret[:1]& 1'b1;
    assert (!((outputs1 == secret1)
        && (outputs2 == secret2)))
```

Exemplary Triggers Over Multiple Clock Cycles

The trigger for a Trojan can arrive at multiple clock cycles. In such exemplary cases, the assignments to the input over multiple clock cycles have to be determined. The exemplary system, method and computer-accessible medium, according to an exemplary embodiment of the present disclosure, can use a G operator—for such determination. Exemplary Property 3 provided below illustrates the assertion using the G operator. When using this operator, the exemplary BMC can unroll the design for multiple clock cycle, and can attempt to find a set of input assignments at multiple clock cycles to violate this property.

Property 3. Assertion to Detect Trojan that Gets Triggered Over Multiple Clock Cycles assert G (((outputs1==secret1) && (outputs2==secret2)))

For example, consider the AES-T800 design from the Trust-hub benchmark suite. This Trojan can leak the key bits [7:0] of AES on applying four plaintexts in consecutive clock cycles (see Table I below). Because of the above assertion, the exemplary BMC can unroll the design for four clock cycles, and can find these plaintexts that can trigger the Trojan.

TABLE I

Trojan detection results

| | Benchmark characteristics | | | Assertion results | | |
|---|---|---|---|---|---|---|
| S. No | Name | Bits leaked | Trigger conditons | Result | Memory (GB) | Total time (s) |
| 1 | AES-T100 | Key bits 0 to 7 | Always on | Detected | 3.92 | 96.1 |
| 2 | AES-T200 | Key bits 0 to 7 | Always on | Detected | 3.92 | 94.23 |
| 3 | AES-T600 | 128 bits of key | When plaintext is 128'hf | Detected | 3.97 | 96.8 |
| 4 | AES-T700 | Key bits 0 to 7 | When plain text is 128'h00112233 445566778899aabbccddeeff | Detected | 3.95 | 96.33 |
| 5 | AES-T800 | Key bits 0 to 7 | On applying the following plain texts consecutively 128'h3243f6a8885a3 08d313198a2e0370734 128'h0011223344556 6778899aabbccddeeff | Detected | 3.95 | 96.86 |

TABLE I-continued

Trojan detection results

| | | Benchmark characteristics | | Assertion results | | |
|---|---|---|---|---|---|---|
| S. No | Name | Bits leaked | Trigger conditons | Result | Memory (GB) | Total time (s) |
| 6 | AES-T900 | Key bits 0 to 7 | 128'h0 128'h1 When the number of clock cycles reaches 128hffffffffffffffffffffffffffffffff | Detected | 3.94 | 96.12 |
| 7 | AES-T1000 | Key bits 0 to 7 | When plain text is 128'h00112233445566 778899aabbccddeeff | Detected | 3.95 | 96.55 |
| 8 | AES-T1100 | Key bits 0 to 7 | On applying the following plain texts consecutively 128'h3243f6a8885a3 08d313198a2e0370734 128'h0011223344556 6778899aabbccddeeff 128'h0 128'h1 | Detected | 3.96 | 96.57 |
| 9 | AES-T1200 | Key bits 0 to 7 | When the number of clock cycles reaches 128hffffffffffffffffffffffffffffffff | Detected | 3.94 | 96.87 |
| 10 | AES-T2000 | 128 bits of key | When plain text is 128'h3243f6a8885a3 08d313198a2e0370734 128'h0011223344556 6778899aabbccddeeff 128'h0 128'h1 | Detected | 3.99 | 94.92 |
| 11 | RSA-T100 | 32 bits of key | When plaintext is 32'h44444444 | Detected | 0.27 | 2.31 |
| 12 | RSA-T300 | 32 bits of key | Every alternate usage | Detected | 0.28 | 2.48 |

Exemplary Direct Polarity vs. inverse Polarity

A Trojan can be said to leak the secret through an output port if there can exist a bijective mapping between them. If there can exist a direct (e.g., inverse) mapping, the leakage can be called direct (e.g., inverse) polarity. Exemplary Property 4 provided below lists two assertions that can detect Trojans that leak secret information through direct and inverse polarities, respectively.

| Property 4. Assertions to detect direct and inverse polarities | |
|---|---|
| assert G | (((outputs1 == secret1) && (outputs2 == secret2))) /*direct polarity*/ |
| assert G | (((outputs1 != secret1) && (outputs2 != secret2))) /*inverse polarity*/ |

Exemplary Detection OF Entropy Corruption

A Trojan which attempts to corrupt the secret information by making it vulnerable to Cryptanalysis can try to reduce the randomness of the corresponding secret information by reducing its entropy from the cryptographic standard. When applying a trigger, the entropy of secret can be reduced from $2^{N+x}$, where N can be the number bits the LFSR possesses and x can be the additional functionality added to increase the randomness for maintaining the Cryptographic standard.

Formally, it can be defined as, for example:

$$\exists \text{ trigger } \exists P \vDash S(si) < 2^{N+x} \forall si \in SI \quad (1)$$

Exemplary Strict Avalanche Criterion Property

The exemplary BMC tool can verify if the given property can be satisfied to prove the correctness of the exemplary design. The SAC can be said to be satisfied if, whenever a single input bit can be complemented, each of the output bits can change with a probability of one half. (See, e.g., Reference 27). This property can be satisfied by all Cryptographically secured pseudo random number generator ("PRNG"). To formally verify the entropy correctness in a cryptographic system, a property can be derived using the SAC condition. Thus, for example:

$$\exists sd1, sd2 \in I \vDash (H(sd1,sd2)==1) \exists P \vDash (H(si1,si2) > N/2) \forall si \in SI \quad (2)$$

The exemplary Property in the above equation can check for the condition for any two seed inputs to a Cryptographic PRNG with Hamming distance of one, which can result in the outputs having the Hamming distance greater than N/2, where N is the total number bits the seed possesses. Any Cryptographic PRNG may satisfy this condition.

Exemplary Detection of Trojans Triggers in Multiple Clock Cycles

Figure 3:
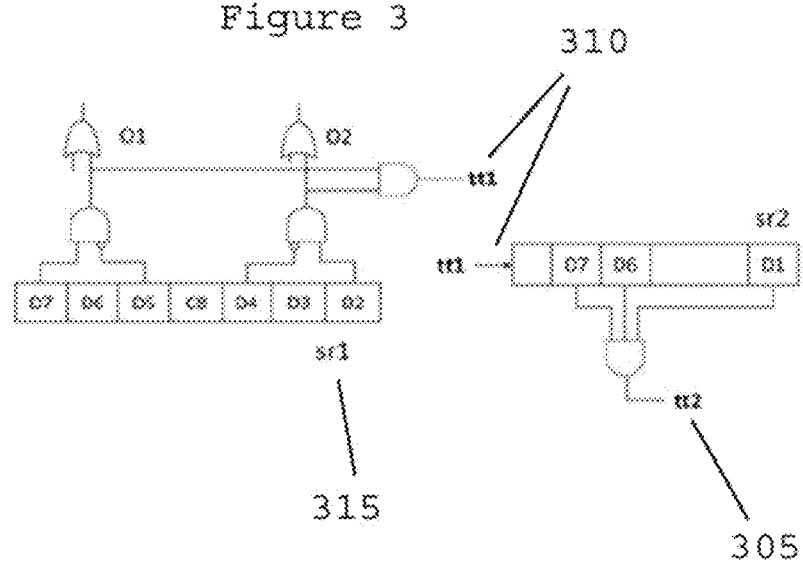
FIG. 3 is a schematic diagram of a trigger control in multiple clock cycles according to an exemplary embodiment of the present disclosure.

There exist Trojans whose trigger vector can arrive over multiple clock cycles. The previous property cannot detect such Trojans. Consider the Trojan trigger design in FIG. 3 (see, e.g., Reference 28) where the signal tt2 (element 305) triggers the Trojan activation in UT Tyler Trojan benchmark. To make signal tt1 (element 310) high, input sequence for LFSR sr1 (element 315) can be "1X0X0X1". tt2 can be high after receiving three logic "1" inputs of tt1 at different clock cycles to make D1,D1 and D1 registers to be at logic "1". In order to make the signal tt2 high by the BMC tool, the input assignment of LFSR sr1 should be controlled by the BMC tool in more than just one clock cycle. Thus, for example:

$$G \quad \exists sd1, sd2 \in I \vDash (H(H(sd1,sd2)==1) \exists P \vDash (H(si1,si2) > N/2) \forall si \in SI \quad (3)$$

To detect such Trojans, the assignments to the input over multiple clock cycles can be determined. The exemplary Property above can use the G operator. The exemplary BMC can unroll the design for multiple clock cycles and can try to find a set of input assignments over those clock cycles that can violate this property.

Exemplary SAC Property Implementation

An exemplary procedure can be used to derive the SAC property and to formally verify it. seed1 and seed2 can be the two seeds for PRNG function. Secret_out1[N] and Secret_out2[N] can be the PRNG outputs for the corresponding seed inputs. Hamming Calc( ) can be the function to calculate the Hamming distance between the two signals. Seed_cond can be the condition for the seed inputs to have hamming distance of one. Secret cond is the SAC condition for the secret outputs from PRNG to have hamming distance greater than or equal to N/2. BMC can try to make the Final Property under test to be logic "0" by taking all the rare trigger condition to prove the Trojan presence. This makes the exemplary BMC tool make Seed_cond be at logic "1" by selecting the corresponding seed inputs and Secret can be at logic "0" by taking the rare Trojan trigger conditions if so any. This exemplary procedure implemented in Verilog/VHDL to result the Final_Property in a single clock cycle.

Exemplary Finite Number of Clock Cycles

In BMC, the number of clock cycles to unroll can be fixed and given by the user. As the simulation complexity increases with the increase in the number of clock cycles, the exemplary BMC can be performed for a limited number of clock cycles. Thus the trustworthiness for the first N clock cycles, where N is the maximum number of clock cycles for which BMC can be performed can be evaluated. For clock cycles ≥N, the trustworthiness of the design may not be guaranteed.

Exemplary Results

Exemplary Experimental Setup

A third party IP on which the Trojan verification can be performed can be instantiated twice into the wrapper which can force the LSB of the input to verify whether it can be connected to the output to value 1 for one instantiation and to value 0 for another instantiation.

The exemplary system, method and computer-accessible medium, according to an exemplary embodiment of the present disclosure, can make an assertion in a way that there should never, or almost never, be a condition where that particular input bit can be equal to any of the output bits in both of the instantiations. If this is the case, it can be inferred that the particular bit can be a direct connection to the output port.

A symbolic model verifier ("SMV") can reach the state where this output can match with the input in both cases to prove the property given in the assertion condition to be wrong. The same procedure can be used to detect the inverse polarity.

Verilog assertions for the Entropy corruption property can be generated for the designs in the benchmark suite CSAW-2013. These assertions were embedded into the respective designs and provided as input to the BMC engine of the SMV tool from Cadence. (See, e.g., Reference 29). An Intel® Xeon E5-2450L 32 cores CPU with 128 GB memory operating at 1.80 GHz has been used to run the simulations. It is possible to use the benchmarks in which the Trojans that corrupt the entropy of information and are triggered by digital inputs were used. This can be because, e.g., (i) the procedure can target Trojans that corrupt information and (ii) in the exemplary threat model, the malicious 3PIP vendor has no control over the design constraints imposed on the SoC by the SoC integrator.

TABLE II

Detecting Trojans that corrupt the Entropy of the Secret information.
We used Trojan structures of Trojan benchmarks from CSAW 2013.

| | Benchmark characteristics | | | Detection results | | |
|---|---|---|---|---|---|---|
| S. No | Name | Cellular Automata? | Trigger condition | FANCI [8] | VeriTrust [9] | Our technique |
| 1 | UT Tyler [21] | Yes | Triggers sequentially after corresponding seed | Not detected | Not detected | Detected |
| 2 | Iowa Sate | No | Three clock cycles after making counter calue "0001" | Not detected | Not detected | Detected |
| 3 | MoMA_Avengers | Yes | Every alternate clock cycle | Not detected | Not detected | Detected |

Algorith 1: Entropy Corruption Detection.

```
Input : seed1[N], seed2[N]
Output: Property
PRNG_uut1(seed1[N], Secret_out1[N]) :
PRNG_uut2(seed2[N], Secret_out2[N]) :
Seed_cond = (Hamming_Calc(seed1[N],seed2[N]) == 1):
Secret_cond = (Hamming_Calc(Secret_out1[N],Secret_out2[N]) ≥ N/2):
Final_Property = Secret_cond | ~(Seed_cond):
assert : G Final_Property:
Hamming_Calc(in1,in2):
for i ≤ N do
   | temp [i] = in1[i] ⊕ in2 [i]:
   | i++:
end
temp2 = temp[0] + temp[1] +..+ temp[N]:
return temp2;
```

Exemplary Detection Capability

A design can be infected with an Entropy corruption Trojan even if SAC property can be failed in any one of the states. Consider the Trojan in UT Tyler which can be activated sequentially by two input and gates once the required seed vector can be inputted. In case of the Iowa State Trojan benchmark, the trigger can arrive in three clock cycles after making a counter to a specific digital sequence. All these rare signals can be triggered by the BMC tool to activate the Trojan to prove its presence.

The exemplary procedure can be oblivious to the structure of the Trojan. For example, UT Tyler (see, e.g., Reference 29) can corrupt the Entropy in Cellular Automata based PRNG, while Iowa State can corrupt the entropy by creating barrel shift register.

The exemplary procedure can also be independent of the underlying procedure; it can detect Trojans in any design.

The last two columns in Table 11 show the memory usage and the time taken. The memory usage can be high because the exemplary BMC can make multiple copies of the design for the number of clock cycles unrolled. However, the memory usage can be within the limits of a modern processor, thus making it feasible to check for several hundred clock cycles. Furthermore, all the Trojans can be detected within 150 seconds. Checking for the final property did not result in any false negatives as it detected all the Trojans. To check for false positives, Entropy corruption on Trojan-free designs from the same benchmark suite. The exemplary system, method and computer-accessible medium, according to an exemplary embodiment of the present disclosure, did not flag these designs as Trojan-infected.

Exemplary Number of Clock Cycles for which the Property is Checked

For a design in CSAW-2013, the trigger can arrive after or within twelve clock cycles for all the Entropy corrupting Trojan Benchmarks. Maximum number of clock cycle used to detect the Trojan's presence can depend upon its trigger and payload requirements. Thus, it can be beneficial to perform BMC for the maximum possible number of clock cycles.

Table III herein shows the maximum number of clock cycles for which SMV can unroll a design and check for the final property. For this experiment, the maximum memory usage was set to 16 GB. In case of Iowa State design, for more than eleven thousand clock cycles can be unrolled. However, in case of other two Cellular Automata designs, only a few hundred clock cycles can be unrolled. This can be because memory usage of the Cadence SMV tool can increase with the increase in state variables. CA designs can have more state variables than LFSR based PRNG designs. Nevertheless, all the Trojans were detected.

If these exemplary designs do not have Trojans, the trustworthiness of the designs for the number of clock cycles unrolled can be guaranteed. Beyond this, no security guarantees can be offered. To be prudent, the SoC integrator has to reset the design once the number of clock cycles exceeds this value. Since the exemplary design was unrolled for several hundred clock cycles, the integrator needs to reset it every several hundred clock cycles, leading to a throughput penalty of less than 1%.

Exemplary Trojan Detection Analysis

Trojans leaking secret information in cryptography IP's can be experimented in SMV with an assertion that can make the Trojan trigger to leak the secret information. Table I above provides the Trojan trigger condition, and its characteristics to leak the secret information with memory and time to detect first bit leakage. The memory and time used by the exemplary SMV can depend on the depth at which the Trojan can be embedded in each exemplary design.

Figure 4:
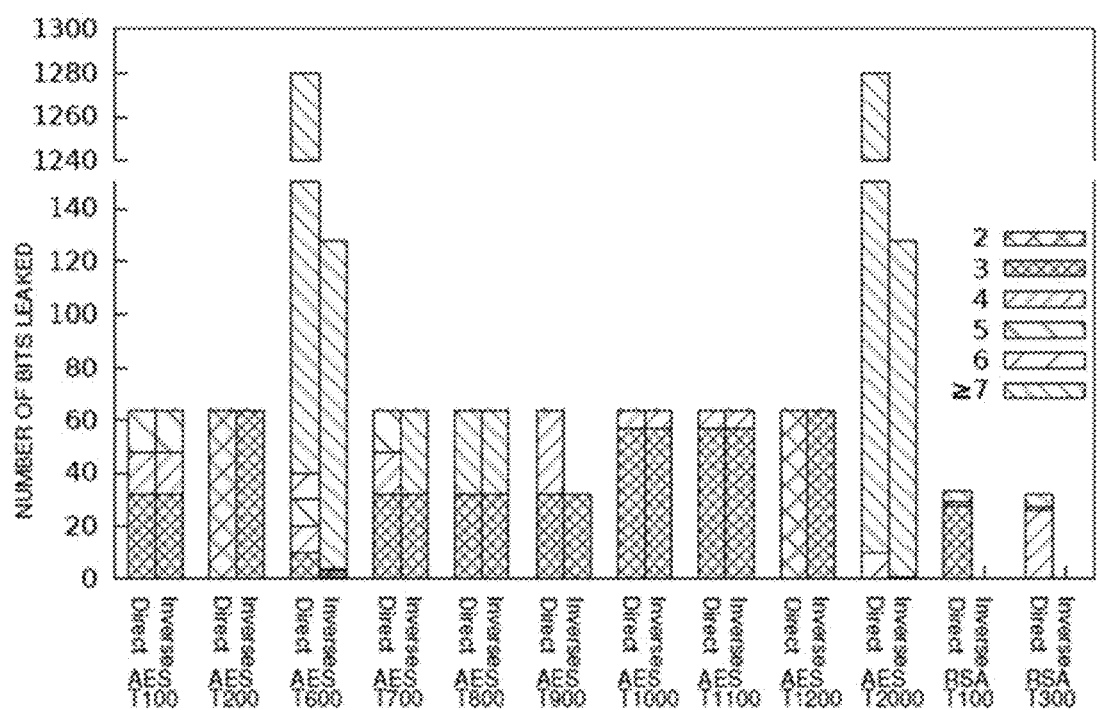
FIG. 4 is an exemplary graph illustrating the number of bits leaked and the number of key-bit output pairs according to an exemplary embodiment of the present disclosure.

In AES-TI00, the first eight Key bits can be connected to the output port by XORing with the internal register with values of some random value which can be shifted in each clock cycle so that all the bits of the internal register can get both 0 and 1 in any one of the clock cycles. This can make the connection of a Key bit to the output port to be in both inverse, and in the same polarity. SMV can be asserted in such a way that it can check for the Key bit leakage in either of the polarity and detect it. The exemplary graph of FIG. 4 illustrates the various Key bit leakage detected in various clock cycles. For AES-T100 it can be inferred that Key bit leaks can be detected at third, fourth, and fifth clock cycles for both the same and the inverse polarity because the number of 1's and 0's can be the same in each state, but those locations can vary at different clock cycles to leak different bits.

The exemplary AES-T200 architecture can resemble AES-T100 except that the internal register which can be XOR'd to the Key bits can be connected to plain text value. The "Z" operator used in the exemplary SMV execution can make all uninitialized registers 0, which can gives the direct path between key bits to the output in the second clock cycle which can be inferred from FIG. 4. Additionally, when the SMV operates with the assertion to check for the inverse polarity of the Key bit in the output port, it can take plain text to be all 1's so that the internal register connected to the Key bit connecting to output port can take a plain text value of all 1's in the third clock cycle after getting cleared by the "Z" operator.

In AES-T600 and AES-T2000, all the 128 bits of Key input can be connected to the multiple output ports with both the same and the inverse polarity. A Trojan can be triggered with corresponding plain text pattern inferred from Table I. From FIG. 4, it can be inferred that there can be 1280 Key bit leaks to the output port with the same polarity, and 128 connections with inverse polarity. SMV can take those plain text patterns and make the Key bit to be leaked to the output to prove the Trojan presence.

AES-T700, AES-T800, AES-T1000 and AES-TI100 have the same architecture as AES-T100, where the internal register can be initialized to some random variable. Table I shows the plain text value which can be taken to trigger the Trojan to shift the bits of internal register in order to leak the Key bits in different clock cycles. From FIG. 4, it can be inferred that in both the same and inverse polarity verification of a Key bit to the output after the initial leak, the leakage of other key bits can be detected after the Trojan trigger condition can be reached by the SMV.

In AES-T900, the internal register XOR'd with Key bit connecting to output can be initialized with some random value, and the Trojan can be triggered after about 2A128 clock cycles. Since the "Z" operator in SMV execution can clear the internal register to all 0's, the SMV can detect all the Key bit connections to the Output port with the same polarity. Because the initialized value of internal register can have an equal number of 1's as 0's, which can facilitate the detection of about 32 inverse polarity connections of Key to output port. The remaining approximately 32 connections may not be detected because the memory of the machine running SMV may not have enough memory to reach 2A128 clock cycles, even though in AES-T1200 the Trojan can be triggered after 2A128 clock cycles. (See, e.g., FIG. 4). The internal register can take the value from plain text irrespective of the Trojan trigger condition. Thus, the exemplary SMV has full control over the selection of the plain text value, so the internal register can take all 0's in the second clock cycle because of the "Z" operator, or all 1's in third clock cycle to detect the same and inverse polarity connection of Key to the output port in the corresponding clock cycles.

In RSA-T100, it can be inferred from Table I that the Trojan can trigger based on the plain text value to leak the about 32 bit key through the output port, where as in RSA-T300, the Trojan can be triggered for every alternate usage which can leak the key through the output port. SMV can reach these states to leak the key bits to prove the Trojan's presence.

Exemplary Maximum Clock Cycle Analysis

Table III provided below shows the maximum clock cycle the SMV can reach for each design to detect the Trojan. Memory of the machine running the SMV can be the constraint which can control the maximum clock cycle which the SMV can reach. Memory used can depend upon the number of combinational and state variables used by the SMV to prove a property to be false. Memory usage can increase exponentially with the increase in state variables. Total time can also depend upon the number of state and combinational variables.

DeTrust can exploit the limitations of FANCI and VeriTrust to design Trojans that can bypass them. (See, e.g., Reference 38). To bypass FANCI, DeTrust designs Trojans whose trigger vector can arrive over multiple clock cycles. If the probability of activating a signal can below a pre-determined threshold, FANCI can mark it as suspicious. For example, if a 128-bit trigger arrives in one clock cycle, the probability of activating the trigger signal can be 2-128, and FANCI can mark it as suspicious. However, DeTrust can make the trigger signals arrive as four-bit nibbles over 32 clock cycles. Now, FANCI can compute the probability of

TABLE III

Maximum clock cycle reaches by SMV when there is a direct and inverse mapping between a key bit and an output port.

| | | Same polarity | | | Inverse polarity | |
|---|---|---|---|---|---|---|
| S. No | Name | Max clock cycle | Memory used (GB) | Total time (s) | Max clock cycle | Memory used (GB) | Total time(s) |
| 1 | AES-T100 | 4400 | 10.66 | 379.12 | 2535 | 12.33 | 155.06 |
| 2 | AES-T200 | 7605 | 11.83 | 174.61 | 2251 | 13.79 | 298.33 |
| 3 | AES-T600 | 1042 | 12.46 | 151.75 | 1042 | 12.45 | 152.41 |
| 4 | AES-T700 | 1203 | 10.57 | 198.15 | 815 | 11.19 | 276.98 |
| 5 | AES-T800 | 1483 | 13.17 | 155.48 | 1583 | 13.52 | 160.36 |
| 6 | AES-T900 | 740 | 13.21 | 1368.93 | 3540 | 14.19 | 169.36 |
| 7 | AES-T1000 | 1640 | 12.26 | 152.52 | 1640 | 12.26 | 153.51 |
| 8 | AES-T1100 | 1655 | 13.76 | 162.0 | 1655 | 13.77 | 161.85 |
| 9 | AES-T1200 | 870 | 13.50 | 1094.01 | 840 | 13.78 | 1385.64 |
| 10 | AES-T2000 | 970 | 12.46 | 180.16 | 1002 | 12.81 | 165.5 |
| 11 | AES-T100 | 220 | 13.50 | 1247.77 | — | — | — |
| 12 | AES-T300 | 160 | 6.453 | 394.99 | — | — | — |

Exemplary Secret Information Leakage Detection in Different Clock Cycle

FIG. 4 also shows the exemplary graph indicating the number of key-bits leaked in different clock cycles in different bench marks, which can be detected by the exemplary SMV. The exemplary leakage detection capability of the SMV in different clock cycles can be dependent on the amount of memory needed to reach that clock cycle. The exemplary SMV can check for an assertion given to prove the Trojan's presence in every clock cycle, and it can run until it can prove its presence. In all the Trojan benchmarks, the leaks in different clock cycles can be detected, except in AES-T900 where the inverse polarity verification of Trojan can detect only about 32 leaks, and the remaining about 32 leaks cannot be detected because of memory limitations.

Exemplary Code/Structural Analysis Procedures

Since 3PIPs can typically be delivered as RTLVHDL/Verilog codes, and code coverage analysis can performed on RTL codes to identify suspicious signals that can be a part of a Trojan. (See. e.g., Reference 33). Even 100% coverage of the RTL code in a design does not guarantee that it can be fault-free. (See, e.g., Reference 34). Thus, code coverage analysis does not guarantee its trustworthiness.

An SoC integrator can automatically analyze the 3PIP code, and mark suspicious signals using controllability and reachability values of signals. (See, e.g., Reference 35). FANCI can mark gates with low activation probability as suspicious. (See, e.g., Reference 36). VeriTrust can mark gates that may not be driven by functional inputs as suspicious. (See, e.g., Reference 37). The implicit assumption here can be that those gates can be driven by Trojans, as they do not perform any computations on functional inputs. The SoC integrator can then manually can analyze the small number of suspicious gates to determine if they can be part of a Trojan.

activating the trigger signal to be 2-4. Since this value can be significantly higher, FANCI does not mark this signal as suspicious. To bypass VeriTrust, DeTrust can ensure that each gate in the Trojan can be driven by a subset of functional inputs.

Exemplary Formal Verification Procedures

An SoC integrator and a 3PIP vendor can agree on a pre-defined set of security properties that the IP vendor should satisfy. (See, e.g., Reference 39). The SoC integrator can check the 3PIP against these properties. To check if a design honors these properties, the target design can be converted into a proof-checking format (e.g., Coq). This procedure has been demonstrated to detect data leakage (see, e.g., Reference 10) and malicious modifications to registers. (See, e.g., Reference 41).

Using the exemplary system, method and computer-accessible medium, according to an exemplary embodiment of the present disclosure, it is possible to check if: (i) a design satisfies pre-defined properties, but not if the design has nothing more and nothing less (see, e.g., Reference 41); (ii) there lack of automation to convert VHDL/Verilog to Coq format; and/or (iii) the VHDL/Verilog and Coq representations of the target design may not be equivalent. If a Coq representation of a design can be considered trustworthy, it does not necessarily mean that the corresponding VHDL/Verilog representation can be trustworthy. Jasper uses a "path-sensitization" technology. It can track a unique tag across the boundaries of secure and insecure regions in a design to check for unauthorized access to security-sensitive areas of the design. (See, e.g., Reference 42). However, this technology can be proprietary.

Exemplary Formally Verifying 3Pips for Data Corruption

The exemplary system, method and computer-accessible medium, according to an exemplary embodiment of the present disclosure, can be used to detect Trojans in 3PIP that can corrupt register that store critical data such as, for example, (i) a secret key of a cryptographic design; (ii) a stack pointer of a processor; and/or (iii) a destination address of a router. Model checking can be used to detect Trojans. The input to the exemplary model checker can be the target property to be checked and a formal description of the design in temporal logic. The output of the model checker can be a set of states, which can satisfy the given property, or a witness (e.g., sequence of inputs), which can violate the property.

Figure 6:
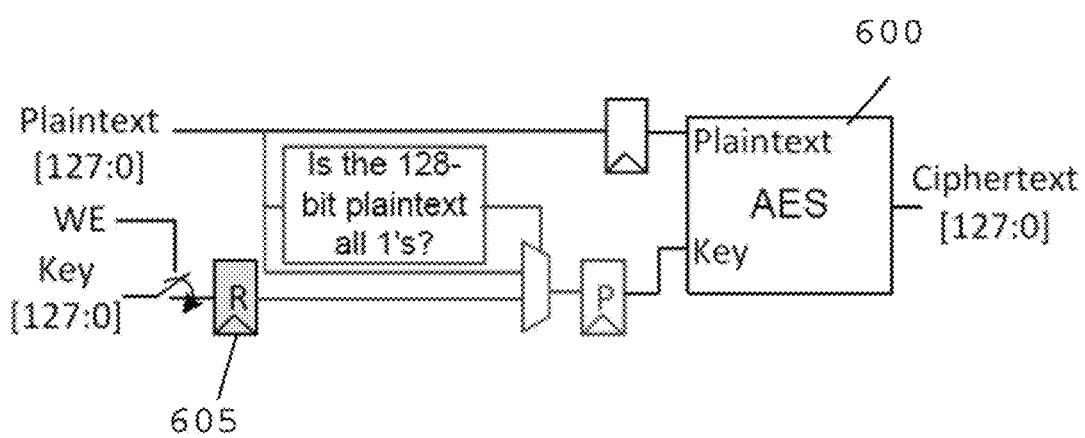
FIG. 6 is a schematic design of a pseudo-critical register according to an exemplary embodiment of the present disclosure.

The exemplary property that can be checked can be "does critical information get corrupted?" For instance, whether register R in FIG. 6 can be corrupted can be checked. If a design violates this property, it can be infected with data-corrupting Trojans; otherwise, it can free from such Trojans.

Certain advantages of formally verifying a design for security properties can be that, for example: (i) it can be used on any design; (ii) it can guarantee detection of data-corrupting Trojans and produce the trigger condition for the Trojan, if the 3PIP has one; and/or (iii) it can be used in conjunction with other exemplary property-based Trojan detection procedures. (See, e.g., References 39-41).

Unlike code/structural analysis, it can, for example: (i) guarantee detection of Trojans that corrupt data; (ii) be fully automated (e.g., no need of manual analysis); and/or (iii) consider both combinational and sequential parts of the design.

Unlike other proof carrying code-based procedures, the exemplary system, method, and computer-accessible medium according to an exemplary embodiment of the present disclosure can (i) guarantee that the design has nothing more and nothing less to corrupt data; (ii) be automated; and/or (iii) use an industry-strength tool (e.g., Cadence VL2SMV) to transform a VHDL/Verilog representation of a design to its temporal logic representation (see, e.g., Reference 43), which is a tool proven to be accurate.

A Trojan which corrupts the critical data stored in register R can formally be defined as for example:

$$\exists\, i_{trigger} \in I, i_{trigger} \notin \mathbb{V} \;\exists\; \vDash (R_{t-1} \neq R_t) \qquad (4)$$

where I can be the set of possible input patterns across all clock cycles [1, t], and Rt can be the value of the register R at clock cycle t. D can be the design and V can be the set of valid ways one can update R. On applying $i_{trigger}$, the critical data, s, can corrupted. The register that holds the critical data can be called the critical register. This data can be important in a cryptographic design, a stack pointer in a processor, or a destination address in a router.

Example 1

Figure 5:
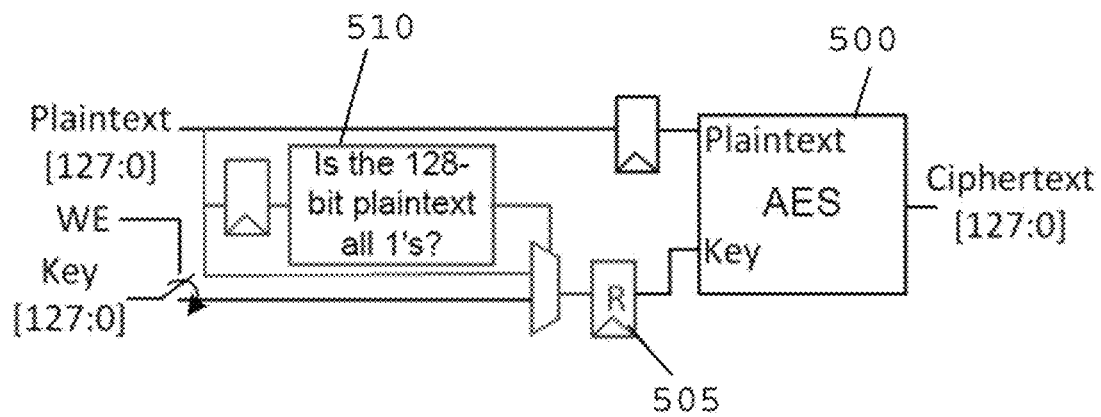
FIG. 5 is a schematic diagram of the exemplary AES design with a hardware Trojan according to an exemplary embodiment of the present disclosure.

Consider the AES 500 design in FIG. 5. One exemplary way to update the key register, R (e.g., element 505), can be setting W E=1. The Trojan can facilitate the plaintext to overwrite the key. The Trojan can be triggered when the 128-bit plaintext 510 in the previous clock cycle can all be 1's. Consequently, the attacker can encrypt the data with the attacker's key, thereby obtaining confidential information.

Based on the trigger vector, a Trojan can be: (i) always on (e.g., no trigger vector); (ii) triggered by only current inputs; (iii) triggered after a specific number of clock cycles; and/or (iv) triggered by inputs arriving over multiple clock cycles. (See, e.g., References 31 and 32). FANCI and VeriTrust can deal with Trojans of type (i) and (ii). DeTrust can design Trojans of type (iii) and (iv) to defeat them. The exemplary system, method and computer-accessible medium according to an exemplary embodiment of the present disclosure can detect data-corrupting Trojans of all types.

Further Exemplary Threat Model

A 3PIP vendor or a rogue element in the 3PIP vendor company can be the attacker. The objective of the attacker can be to subvert the security of the SoC, which can be done using the attacker's IP. The attacker can introduce hardware Trojans in the IP to corrupt critical data. The attacker can only insert Trojans whose trigger and payload characteristics can be "digital." This can be because the attacker cannot design a Trojan that can depend on the physical characteristics of the SoC as these characteristics can be determined by the design-synthesis constraints. Thus, the 3PIP vendor has no control over the design constraints imposed on the SoC by the SoC integrator. This assumption can be consistent with the other RTL 3PIP Trojan detection procedures. (See, e.g., References 35-39).

The SoC integrator can be the defender. The defender's objective can be to detect Trojans, if any, in the 3PIP. It can be assumed that the defender has access to the RTL/gate-level netlist of the 3PIP since the defender can buy the 3PIP. Thus, the defender can perform functional verification on the 3PIP. Furthermore, the defender knows the functionality of the input and output ports of the 3PIP from the specification.

Exemplary Protocol to Verify Trustworthiness of an IP

A previously-known protocol can be used with the exemplary system, method and computer accessible medium according to an exemplary embodiment of the present disclosure. (See, e.g., References 39-42). The SoC integrator and the IP vendor can agree upon a set of properties for the design. These properties can be the valid ways to load/modify the critical registers. For instance, a property can be the valid way to update the key in a crypto module. The attacker in the IP design house can insert Trojans that can corrupt critical data, while satisfying the pre-defined properties. The task of the defender can be, e.g.: (i) the defender needs to check if the design satisfies the pre-defined properties; and/or (ii) the defender needs to check that the design has nothing more or nothing less, in the exemplary context, to corrupt the data.

Further Exemplary Methods in Hardware Design

Formal verification can be or include an approach to ensure that the safety-critical components of the design can be exhaustively tested for correctness. (See, e.g., Reference 45). Quality criteria can be specified using properties described in temporal logic and its variations. (See, e.g., Reference 46). In LTL, the notion of time can be that of a linearly ordered set (e.g., this can be thought of as a possible sequence of states).

Exemplary Model Checking

The exemplary process of analyzing a design for the validity of properties stated in temporal logic can be called model checking. The input to a model checker can be a formal description of the design in temporal logic. Its output can be a set of states, which can satisfy the given property, or a witness of a sequence, which can violate the property. (See, e.g., Reference 43). The target property can embedded along with the Verilog representation of the design. A model checker can take the Verilog code along with the property written as Verilog assertion and derive a Boolean SAT formulation for validating/invalidating the property. This SAT formulation can be fed to a SAT engine, which can then search for an input assignment that violates the property.

Further Exemplary Bounded Model Checking

In practice, designers may know the bounds on the number of steps (e.g., clock cycles) within which a property should hold. This can lead to BMC, where the property can be determined to hold within a finite sequence of state transitions. The Boolean formula for validating/invalidating the target property can be given to a SAT engine, and if a satisfying assignment can be found for T clock cycles, that assignment can be a witness for the target property. (See, e.g., Reference 47). Exemplary properties to detect Trojans that corrupt critical data and verify the target design against these properties can be provided using a bounded model checker.

Further Exemplary Formal Method in Hardware Security

SAT-based procedures have been used to detect fault attacks. (See, e.g., Reference 48). Satisfiability Modulo Theory-based procedures have been used to evaluate the strength of software counter-measures against side-channel attacks. (See, e.g., Reference 49). These procedures do not target detecting Trojans.

Exemplary Detecting Data Corruption

Exemplary Data Corruption

A description of a simple property to detect data corruption in critical registers is as follows. For example, consider a Trojan corrupting the data stored in an N-bit register, R. The input pattern i applied at clock cycle t can be denoted as it. Let I be the set of all possible input patterns, and i∈I. Let S be the sequence of inputs i1, i2, . . . , iT applied in the time interval [1, T]. Let V be the set of valid ways one can update R. Thus, for example:

$$\bigwedge_{x=1}^{N} \forall (S \notin \mathbb{V}) \Rightarrow R_{x,t-1} = R_{x,t} \quad (5)$$

where, Rx,t can be the value of the xth bit of R at clock cycle t. This exemplary property can be written as a Verilog assertion and can be given to a BMC tool along with the target design. The bound for BMC can be set as T clock cycles. If BMC does not detect a counterexample that violates this property, there may be no input sequence, other than those in V, that can modify R within T clock cycles. However, if BMC outputs a counterexample that violates this property, R can be modified in an unauthorized way, and that counterexample can be the input sequence.

Example 2

Consider the AES design 600 shown in FIG. 6. On checking the corruption of the key register, R (e.g., element 605), using the property in Equation (5), BMC can produce a counterexample with plaintext being all 1s to trigger the Trojan.

Exemplary Partial Corruption.

If an attacker modifies a subset of the bits in R, the property can detect this Trojan as it checks for individual bits of R. It can account for triggers arriving at a single clock cycle as well as over multiple clock cycles.

Example 3

Can consider the Trojan in AES-T800 from the Trust-hub. (See, e.g., Reference 44). The Trojan can corrupt the least-significant eight bits of the secret key. One needs to apply four pre-selected plaintexts consecutively to trigger the Trojan. The Trojan will not be triggered if these plaintexts do not arrive in sequence. BMC can produce a counterexample for the property in Equation (5). The counterexample can include the four plaintexts, which can trigger the Trojan.

Exemplary Speeding-Up Using an a TPG

The simulation complexity of BMC can increase with the increase in the number of clock cycles. Thus, the trustworthiness can be evaluated for the first T clock cycles, where T can be the maximum number of clock cycles for which BMC can be performed. For clock cycles ≥T, the trustworthiness of the design cannot be guaranteed. This can be similar to the trustworthiness guarantees previously provided. (See, e.g., Reference 50). The exemplary design should be reset for every T clock cycles as previously disclosed. (See, e.g., Reference 50).

Example 4

In the case of AES-T800, if the design can be unrolled for at least four clock cycles, BMC can find the four plaintexts that can trigger the Trojan. However, if the design can be unrolled for three clock cycles, BMC does not produce any counterexample. Consequently, the Trojan may not be detected. Thus, as many clock cycles as possible needs to be checked for.

An Automatic Test Pattern Generation ("ATPG"), can be used instead of BMC, to check the validity of a property. (See, e.g., Reference 51). This way, the trustworthiness for more number of clock cycles can be ensured. ATPGs can be faster and more efficient than a SAT-based BMC tool because ATPGs can efficiently balance depth-first and breadth-first searches to generate a counterexample or its absence, while BMC uses a depth-first search.

The exemplary procedure to validate a property using an ATPG can as follows. (See, e.g., Reference 51). The property can be modeled as a monitor circuit, which can be appended with the target circuit. An exemplary test can be generated for a stuck-at-1 fault at the output of this monitor circuit, which can force the ATPG to generate an input pattern that violates this property. If an ATPG generates a test pattern, the property can be violated; the test pattern generated by the ATPG can be the counterexample that violates this property. If the fault may not be detected, then the property can hold true. If an ATPG returns untestable, the trustworthiness of the design cannot be guaranteed. The monitor circuit may only be for validation purposes and need not be implemented in silicon, leading to no overhead.

Verilog assertions were generated for the data corruption property above for the designs in the Trust-Hub benchmark suite. (See, e.g., Reference 44). The valid ways to update the registers in the benchmark designs were obtained from their datasheet. Trojans designed by DeTrust were used. (See, e.g., Reference 38). These assertions were embedded into the respective designs and were provided as input to the BMC engine of the SMV tool from Cadence. (See, e.g., Reference 43). The ATPG tool from Synopsys Tetrmax with the "full-sequential" option was used. (See, e.g., Reference 52). An Intel® Xeon E5-2450L 32 cores CPU with 128 GB memory operating at 1.80 GHz to runm the simulations was used. Only the benchmarks in which the Trojans that modify data and can be triggered by digital inputs were used. This can because (i) the exemplary procedure can target Trojans that corrupt data; and/or (ii) in the exemplary threat model, the malicious 3PIP vendor may have no control over the design constraints imposed on the SoC by the SoC integrator.

The first three columns in Table IV below show the exemplary characteristics of the Trojans. In case of MC8051 and RISC, the Trojans corrupt the critical registers of a processor. In case of AES, they corrupt the register holding the secret key. The trigger condition varies from trigger arriving in one clock cycle (e.g., MC8051-T700) to trigger arriving over multiple clock cycles (e.g., MC8051-T400) to a trigger arriving after a specific number of clock cycles (e.g., AES-T1200).

plary system, method and computer-accessible medium concluded that this design can be trustworthy for 214 clock cycles, which matches with the Trojan behavior.

TABLE IV

| Trojan | | | FANCI De-tected? | Veri-Trust De-tected? | BMC | | | | ATPG | | | |
|---|---|---|---|---|---|---|---|---|---|---|---|---|
| Name | Vector | Payload | | | De-tected? | Time (s) | Memory (GB) | Max. # of clk cycles | De-tected? | Time (s) | Memory (GB) | Max. # of clk cycles |
| MC8051-T400 | Instruction = (1) MOV A D (or) MOV A Data (2) MOVX A, @RI (3) MOVX A, @DPTR (4) MOVX @RI, A | Prevents Interrupt Interrupt | No | No | Yes | 0.01 | 0.01 | 140 | Yes | 0.001 | 0.01 | 480 |
| MC8051-T700 | MOV D Data | Modifies the data to 0x00 | No | No | Yes | 0.01 | 0.09 | 160 | Yes | 0.001 | 0.01 | 450 |
| MC8051-T800 | Input data of UART = 0xFF | Decrements stack pointer by two | No | No | Yes | 0.01 | 0.1 | 160 | Yes | 0.001 | 0.01 | 430 |
| RISC-T100 | After 100 instructions whose 4 MSBs values are 0x5 to 0xB | Increments program counter by two | No | No | Yes | 23.86 | 1.2 | 50 | Yes | 8.57 | 0.2 | 160 |
| RISC-T300 | | Modifies the data written to memory | No | No | Yes | 75.63 | 3.2 | 60 | Yes | 0.56 | 0.19 | 160 |
| RISC-T400 | | Modifies the data address to 0x00 | No | No | Yes | 74.67 | 1.8 | 60 | Yes | 0.58 | 0.19 | 160 |
| AES-T700 | Plaintext = 128'h00112233445566778899aabbccddeeff | Modifies LSB 8-bits of key register | No | No | Yes | 40.6 | 2.01 | 50 | Yes | 0.22 | 0.74 | 150 |
| AES-T800 | Plaintext = (1) 128'h3243f6n8885n308d313198n2c0370734 (2) 128'h00112233445566778899aabbccddeeff (3) 128'h0 (4) 128'h1 | Modifies key register | No | No | Yes | 40.6 | 2.01 | 70 | Yes | 0.41 | 0.77 | 160 |
| AES-T1200 | After $2^{128}$ clock cycles | Modifies key register | No | No | N/A | N/A | N/A | N/A | 160 | N/A | N/A | 160 |

Exemplary Further Detection Capability

A design can be infected with a data-corrupting Trojan even if one bit of the critical register can be modified. Columns 4-6 and 7 in Table IV show the detection capability of different procedures. FANCI (see, e.g., Reference 36) and VeriTrust (see, e.g., Reference 37) did not detect any Trojans as reported by DeTrust. (See, e.g., Reference 38). The exemplary procedure, both BMC and ATPG based implementations, detected all Trojans except for AES-T1200.

In AES-T1200, the Trojan can be triggered after 2128-1 clock cycles. The Trojans can consist of a 128-bit counter to count the number of clock cycles. To generate a counterexample that triggers this Trojan, the design for 2128-1 clock cycles can be unrolled, which can be computationally infeasible.

When BMC can be performed for 214 clock cycles, the key register may not be corrupted. Consequently, the exem- The exemplary system, method and computer-accessible medium according to an exemplary embodiment of the present disclosure can be oblivious to the structure of the Trojan. For example, the Trojan in MC8051-T400 has a finite state machine, and the Trojan in MC8051-T800 has only combinational logic. BMC and ATPG based procedures detect both these Trojans by setting the input instructions to values that trigger them. The procedure can be independent of the underlying design; it can detect Trojans in MC8051, RISC and AES.

Columns 7 and 8 in Table IV show the memory usage and the time taken for the BMC implementation. The memory usage for BMC can be in the range of GBs because BMC can make multiple copies of the design for the number of clock cycles unrolled. Furthermore, all the Trojans were detected within 100 seconds. Columns 11 and 12 in Table IV show the memory usage and the time taken for ATPG implementation. The memory usage of ATPG can be an order of magnitude low than that of BMC. This can be because ATPG can efficiently balance depth-first and breadth-first searches. In this exemplary case, all the Trojans were detected within a second.

Columns 9 and 13 in Table IV show the maximum number of clock cycles for which BMC and ATPG, respectively, can unroll a design. For this experiment, a time constraint of about 60 seconds was set. The number of clock cycles unrolled by ATPG can be 3× than that of BMC. In all these exemplary designs, a few hundred clock cycles can be unrolled. To be prudent, the SoC integrator can reset the design once the number of clock cycles exceeds a particular value. Since the exemplary design was unrolled for several hundred clock cycles, the integrator can be reset it every several hundred clock cycles, leading to a throughput penalty of less than about 1%.

Checking for the data-corruption property did not result in any false negatives the exemplary system, method, and computer-accessible medium detected all the Trojans. To check for false positives, data corruption in Trojan-free MC8051, RISC and AES designs from the same benchmark suite was checked for. The exemplary system, method and computer-accessible medium, according to an exemplary embodiment of the present disclosure did not flag these designs as Trojan-infected.

Exemplary Case Study: Detecting Data Corruption in a RISC Processor

The RISC processor in the Trust-hub benchmark suite can be a 4-cycle non-pipelined processor. (See, e.g., Reference 44). The valid ways to update the registers were obtained from its datasheet. (See, e.g., Reference 53). Table V below shows some of the registers in this design, the valid ways to update them, and the corresponding values.

TABLE V

| Register | Cycle | Condition | Value |
|---|---|---|---|
| Program counter | Any | Reset = 1 | 0x00 |
| | 4 | Stall = 0 | Increment by 1 |
| | 4 | Interrupt = 1 & Stall = 0 | 0x04 |
| | 4 | Return = 1 & Stall = 0 | Stack array[Stack pointer] |
| | 4 | Goto = 1 & Stall = 0 | {PC Latch, Instr. register} |
| | 4 | Destination = PCL | {PC Latch, Output of ALU} |
| Stack pointer | Any | Reset = 1 | 0x00 |
| | 2 | Return = 1 | Decrement by 1 |
| | 4 | Call = 1 | Increment by 1 |
| Interrupt enable | Any | Extl. Interrupt | 0x01 |
| | Any | Overflow | 0x01 |
| | Any | Write complete | 0x01 |
| EEPROM data | 4 | Stall = 0 & EEPROM read = 1 | EEPROM input |
| EEPROM address | 4 | Stall = 0 | RAM[0x09] |
| Instruction register | 4 | — | Program counter |
| Sleep flag | Any | Reset | 0 |
| | 4 | Sleep inst. | 1 |

The RISC-T100 Trojan affects the program counter when triggered. During conventional operation (e.g., when there may be no stall), the program counter value increments by 1. If there can be a "Goto" instruction, the instruction register values can be copied to the program counter. Other instructions should not affect the program counter. The Trojan can be triggered when the four MSBs values of instruction register can be between 0x5 and 0xB for 100 clock cycles. When triggered, the program counter value can be incremented by two. The exemplary procedure detected this Trojan because non-Goto instructions changed the program counter.

The RISC-T300 Trojan can affect the EEPROM data when triggered. During normal operation (e.g., when there may be no stall), the values in EEPROM input can be copied to EEPROM data when EEPROM read signal can be enabled. The triggering mechanism can be same that of RISC-T100. The exemplary procedure detected this Trojan because the contents of EEPROM data can be changed when EEPROM read signal can be disabled.

The RISC-T400 Trojan changes the EEPROM address to 0x00 when triggered. During conventional operation (e.g., when there may be no stall), the values in the special purpose register, RAM [0x09], can be copied to EEPROM address. The triggering mechanism can be same that of RISC-T100. The exemplary technique detected this Trojan because the contents of EEPROM address were changed when there was a stall.

Exemplary Violating the Data-Corruption Property

The property described above can be verified if the critical register can be corrupted. Below is description of two attacks where computations can be performed on corrupted data, while the contents of critical registers may not be corrupted. The attacks can use pseudo-critical and bypass registers.

Exemplary Pseudo-Critical Registers

Exemplary Attack of Pseudo-Critical Registers

A malicious 3PIP vendor or a rogue element in a 3PIP design house can deceive the defender by introducing pseudo-critical registers. The input to a pseudo-critical register can be the output of a critical register. The pseudo-critical register can feed the fan-out logic of the critical register, instead of the critical register. An attacker, instead of using the contents of the critical register, can use the contents of the pseudo-critical register. The attacker can corrupt the contents of pseudocritical registers. The defender can check the critical register for corruption, but not the pseudo-critical register. Consequently, this Trojan may not be detected.

Example 5

Consider the modified AES-T600 Trojan shown in FIG. 6. An attacker can inform that R holds the critical data, and the defender can check if R can be corrupted or not. However, R can feed the pseudo-critical register, P. The contents of P can be corrupted when the Trojan can be triggered. Since the defender can check R but not P, this Trojan may not be detected.

Exemplary Defense of Pseudo-Critical Registers

The defender has to detect pseudo-critical registers and check if they can be corrupted in a malicious way. Pseudo-critical registers can be detected as follows. Let R be a critical register. P can be a pseudo-critical register if every update for R updates P, especially on using valid ways (V) to update/modify R. Formally, $$\forall\,(S \in \mathbb{V}) \Rightarrow \bigvee_{x=1}^{N} (P_{x,t} = S_{x,t-1}) \vee (P_{x,t} = \neg S_{x,t-1}) \quad (6)$$

Example 6

In FIG. 2. P can be the pseudo-critical register of R. On checking P for the property in Equation (5), the defender can determine that it can be corrupted, thereby detecting the Trojan.

It may not be necessary that the contents of R can be directly copied to P. Sometimes, a Boolean function of the contents of R can be copied to P. For example, an attacker can invert the content of R before copying it to P. The output of P can be inverted once again to retain the original value.

For an N-bit register, there can be 22 possible Boolean functions. However, since Equation (6) deals with individual bits of R, there may only be four possible Boolean functions for a bit x: {1, 0, x, ¬x}. An attacker cannot force a bit in P to constant 1 or 0, as it can be equivalent to a stuck-at fault. Such faults can be revealed during functional testing with valid ways, V that update R and thereby P. Consequently, an attacker can force a bit in P to be either x or ¬x. Equation (6) checks for both these cases. A pseudo-register can also be before the critical register. In such cases, $P_{x,t-1}$ and $R_{x,t}$ can be used instead of $P_{x,t}$ and $R_{x,t-1}$, respectively, in Equation (6).

Any register in the design can be a pseudo-critical register for any critical register. Thus, a defender has to check for all pairwise combinations of registers using Equation (6). Identifying a pseudo-critical register does not necessarily mean it can be corrupted. A designer has to check if its contents can be corrupted using Equation (5).

Exemplary Bypass Registers

Exemplary Attack of Bypass Registers

Figure 7:
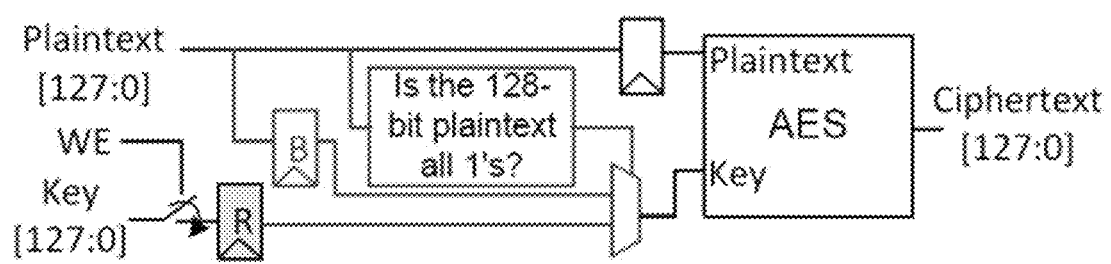
FIG. 7 is a schematic diagram of a bypass register according to an exemplary embodiment of the present disclosure.

An attacker can bypass the output of a critical register using a bypass register as shown in FIG. 7. The input to the bypass register, B, can be a corrupted value. Once the Trojan can be triggered, the multiplexer at the fan-out logic of the critical register, R, can select the corrupted value from B instead of the valid value from R. The attacker can evade the defender as the attacker checks R, but not B.

Example 7

Consider the modified AES-T600 Trojan in FIG. 7. An attacker can inform that R holds the critical data. The defender only checks if R can be corrupted or not. The bypass register, B, holds the corrupted data. When the Trojan can be triggered, the contents of the B can be selected instead of R. Since the defender may not be checking B but only R, the Trojan may not be detected.

Exemplary Defense of Bypass Registers

When the Trojan can be triggered, the output of the critical register may be ignored, and only that of the bypass register can be used. Consequently, the critical register does not have any effect on the output. This may not be possible, unless the critical register can be bypassed. This property can be used to detect bypass registers. Let O be the set of output ports and R be the critical register. $o_{t+1,p}$ can be the value of output port o at time t+1 when the value of R can be p. ThuS, $$\neg \exists S \forall i_{(t+1)} \in 1 \forall p, q \in \mathbb{R}, p \neq q \Rightarrow \bigwedge_{o \in O} O_{t+1,p} = O_{t+1,q} \quad (7)$$

where R can be the set of all possible values of R. If the latency between the critical register and o can be L, one needs to check the output at t+Lth clock cycle.

Example 8

In FIG. 7, the critical register R holds the AES key. The ciphertext should vary when the key can be changed. When the Trojan can be triggered, the key can be obtained from register B but not from R. Thus, the contents of R will not have any effect on ciphertext when the Trojan can be triggered. This may not be true for AES. Consequently, Equation (7) can be violated.

Exemplary Procedure A below shows the steps to detect Trojans that corrupt critical registers even in the presence of pseudo-critical and bypass registers. Its inputs can be the netlist of the design (P), the list of registers, the list of registers that hold critical data, the set of valid ways to update them, and the number of clock cycles (T) for which the trustworthiness has to be evaluated. A defender can obtain the list of registers by parsing the netlist. First, the exemplary procedure can identify pseudo-critical registers for each critical register and add them to the list of critical registers. Second, the exemplary procedure can check if a critical register can be corrupted or not. If it can be corrupted, the procedure can exit by saying "Trojan found." Additionally, it can present an example set of input sequences (e.g., CounterExample) that can corrupt the register. Finally, it can also find bypass registers, if any. If the exemplary procedure does not find any input sequences to corrupt the critical registers or bypass registers, it can terminate. The exemplary procedure can guarantee the trustworthiness of the design only for the specified number of clock cycles (T).

---

Input : Netlist,ListofRegister,ListofCriticalRegister,ValidWays
P = Netlist;
For each Register$_i$ in ListofCriticalRegister do
| V = ValidWays[Register$_i$];
| For each Register$_j$ in ListofRegister do
| | if CheckPseudoRegister(P ,Register$_i$,Register$_j$,V,T)
| | then
| | | ListofCriticalRegister +=Register$_j$;
| | end
| end
| (TrojanFlag, CounterExample) =
|         CheckForCorruption(P ,Register$_i$,V,T);
| if TrojanFlag == 1 then
| | print("Register$_i$ is corrupted for CounterExample");
| | exit( );
| end
| (TrojanFlag, CounterExample) =
| CheckForBypass(P ,Register$_i$,V,T);
| if TrojanFlag == 1 then
| | print("Register$_i$ is bypassed for CounterExample");
| | exit( );
| end
end
print("No data-corruption Trojan found for T clock cycles");

---

Exemplary Procedure A: Detecting Data Corruption

If a Trojan corrupts a critical register or bypasses it, there has to be a circuit path between the Trojan and the critical register. Thus, the Trojan circuit can be either at the front, the back or can be converging with the critical register in its fan-out logic. Equations (5) and (6) detect Trojan circuits which can be at front or back of the critical register. Equations (5) and (7) detect Trojan circuits which converge with the critical register. Thus, all Trojans that corrupts critical registers or bypasses them can be detected.

Further Exemplary Results

To analyze the effectiveness of the procedures in detecting pseudo-critical and bypass registers, the exemplary designs in the Trust-hub benchmark suite was modified to include such registers, using Trojans from DeTrust. (See, e.g., Reference 38). For this exemplary experiment, a time constraint of 60 seconds was set.

Table VI below summarizes the results. FANCI (see, e.g., Reference 36) and VeriTrust (see, e.g., Reference 37) did not detect any of the Trojans as mentioned by DeTrust. (See, e.g., Reference 38). The exemplary procedures, both BMC and ATPG implementations, detected pseudo-critical and bypass registers. Only in AES-T1200, the exemplary procedure was not able to detect the bypass register. This can be because the bypass register can be activated only after about 2128 clock cycles. The exemplary procedure flags this design as "trustworthy" for the first 1000 clock cycles because the critical register may not be bypassed till then.

TABLE VI

| | Detected? | | | | Max. # of clock cycles | | | |
| | FANCI | Veri- | | | Psuedo-critical | | Bypass | |
| Name | [7] | Trust [8] | BMC | ATPG | BMC | ATPG | BMC | ATPG |
| --- | --- | --- | --- | --- | --- | --- | --- | --- |
| MC8051-T400 | No | No | Yes | Yes | 160 | 450 | 180 | 480 |
| MC8051-700 | No | No | Yes | Yes | 110 | 500 | 120 | 540 |
| MC8051-T800 | No | No | Yes | Yes | 140 | 500 | 150 | 540 |
| RISC-T100 | No | No | Yes | Yes | 60 | 160 | 70 | 190 |
| RISC-T300 | No | No | Yes | Yes | 70 | 160 | 90 | 190 |
| RISC-T400 | No | No | Yes | Yes | 70 | 160 | 50 | 130 |
| AES-T700 | No | No | Yes | Yes | 60 | 150 | 45 | 120 |
| AES-T800 | No | No | Yes | Yes | 70 | 150 | 50 | 130 |
| AES-T1200 | No | No | Yes | N/A | 70 | 150 | — | — |

It can be easier to check the property for pseudo-critical register, when a register can be easily controllable. It can also be easier to check the property for bypass register, when a register can be easily observable. The critical register (e.g., key register) of AES can be closer to the inputs. Thus, it can be relatively easier to control than observe. Consequently, the number of clock cycles unrolled to check for pseudo-critical registers can be greater than that of bypass registers. Contrarily, the critical registers in MC8051 and RISC can be closer to the outputs. Thus, they can be relatively easier to observe than control. Thus, the number of clock cycles unrolled to check for pseudo-critical registers can be less than that of bypass registers.

Similar to Table IV, the number of clock cycles unrolled by ATPG can be 2.5× than that by BMC. Given sufficient time, approximately 30 minutes, the design can be unrolled for more than hundred clock cycles. Consequently, the integrator needs to reset it only every several hundred clock cycles, leading to a throughput penalty of less than 1%.

Exemplary Scalability

BMC and ATPG can be NP-complete problems. (See, e.g., References 43 and 52). However, efficient heuristics developed for practical circuits reduce this complexity of ATPG to polynomial in the number of gates in the circuit. (See, e.g., Reference 54). Furthermore, companies regularly use BMC and ATPG procedures to perform functional validation of large-scale designs. Thus, the exemplary system, method and computer-accessible medium, according to an exemplary embodiment of the present disclosure can be practical and scalable for large designs. (See, e.g., Reference 43). This exemplary procedure can be used for security.

Figure 8:
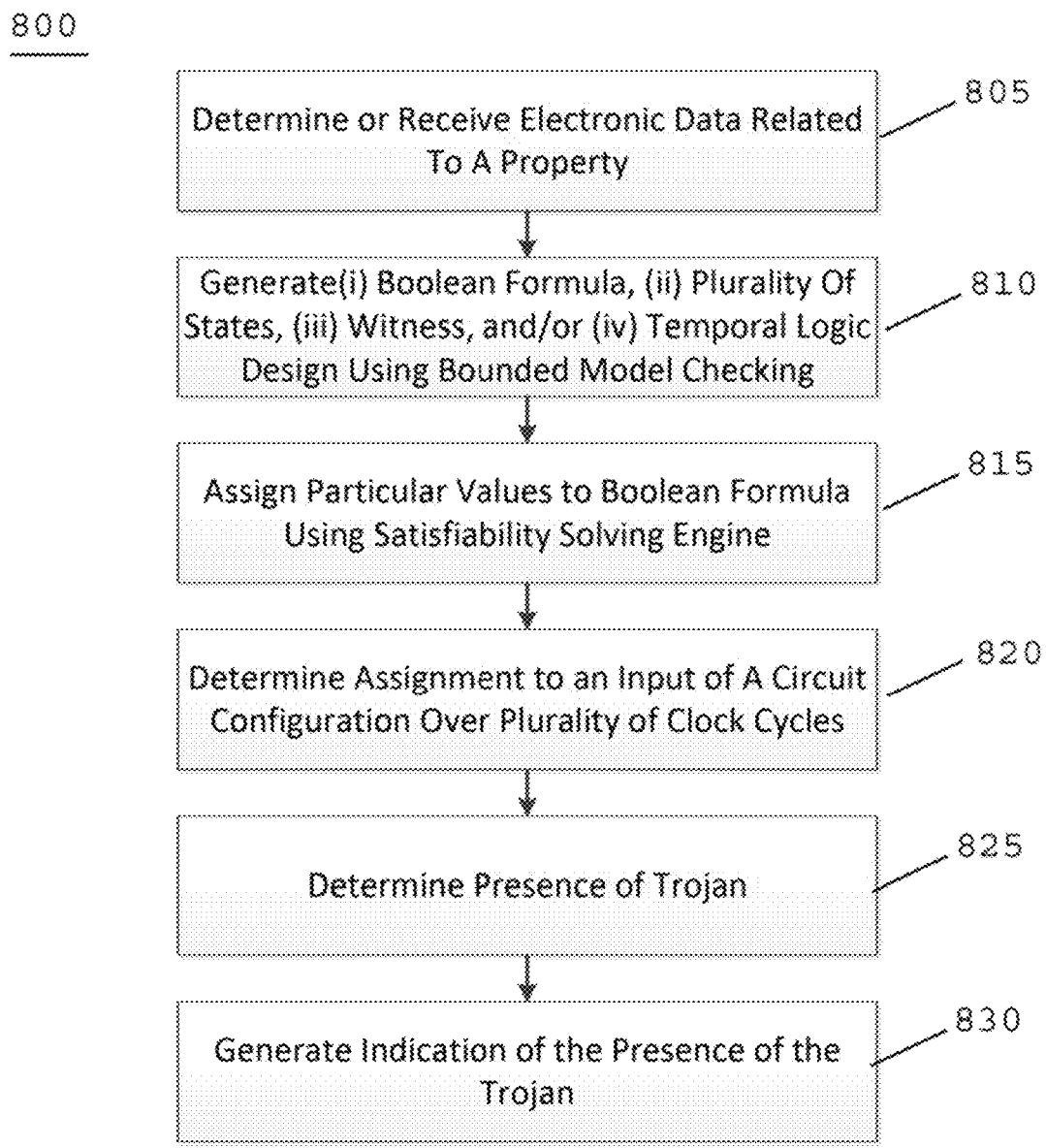
FIG. 8 is a flow diagram of an exemplary method for determining the presence of a Trojan in a configuration according to an exemplary embodiment of the present disclosure.

FIG. 8 shows a flow diagram of an exemplary method 800 for determining the presence of a Trojan in a configuration according to an exemplary embodiment of the present disclosure. For example, at procedure 805, electronic data related to a property can be determined or received. At procedure 810, (i) a Boolean formula, (ii) a plurality of states, (iii) a witness and/or a temporal logic design can be generated using a bounded model checking tool, and particular values can be assigned to the Boolean formula using a satisfiability solving engine at procedure 815. At procedure 820, one or more assignments to an input of a circuit configuration can be determined over a plurality of clock cycle. At procedure 825, the presence of the Trojan can be determined, and an indication of the presence of the Trojan can be generated at procedure 830.

Figure 9:
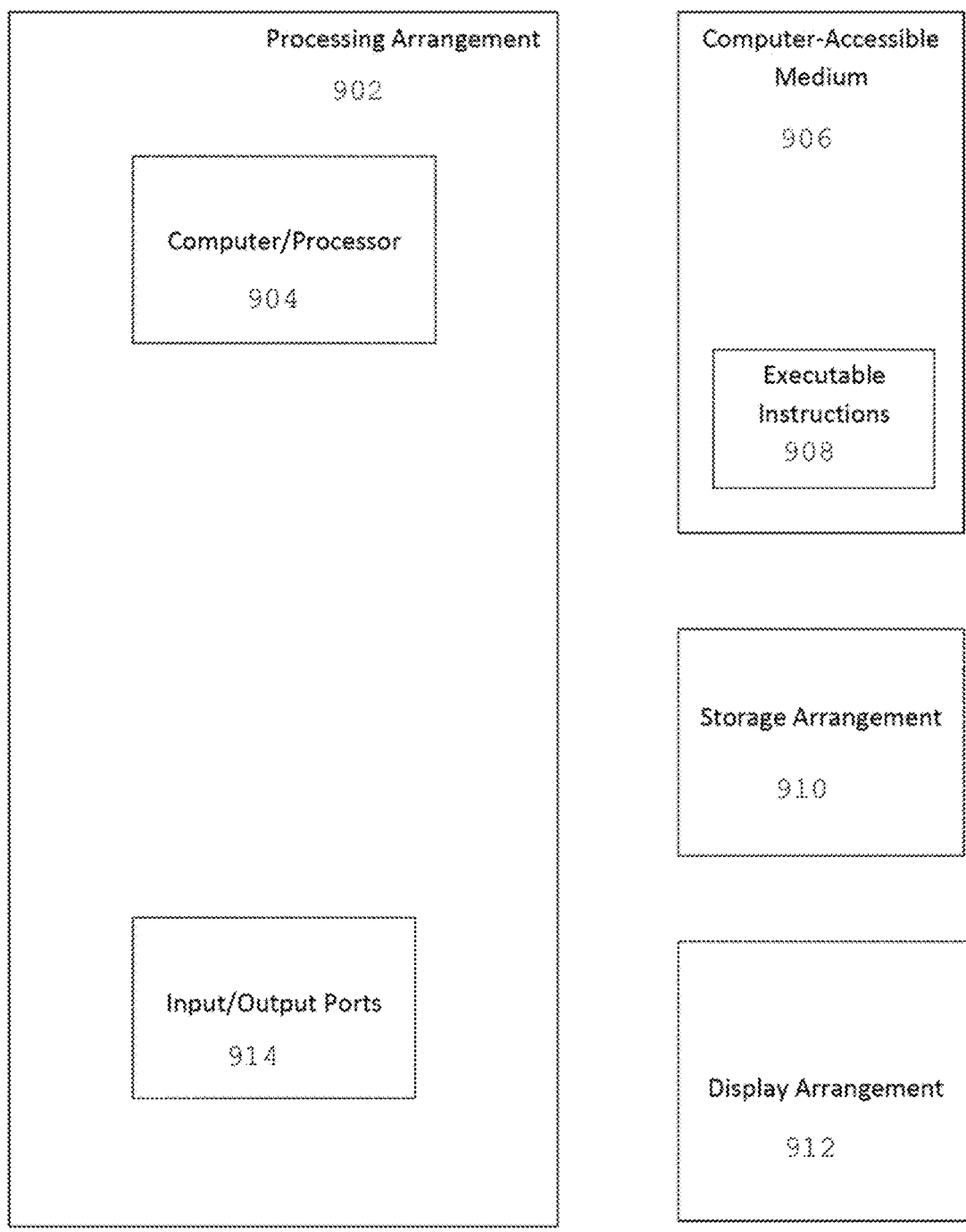
FIG. 9 is an illustration of an exemplary block diagram of an exemplary system in accordance with certain exemplary embodiments of the present disclosure.

FIG. 9 shows a block diagram of an exemplary embodiment of a system according to the present disclosure. For example, exemplary procedures in accordance with the present disclosure described herein can be performed by a processing arrangement and/or a computing arrangement 902. Such processing/computing arrangement 902 can be, for example entirely or a part of, or include, but not limited to, a computer/processor 904 that can include, for example one or more microprocessors, and use instructions stored on a computer-accessible medium (e.g., RAM, ROM, hard drive, or other storage device).

As shown in FIG. 9, for example a computer-accessible medium 906 (e.g., as described herein above, a storage device such as a hard disk, floppy disk, memory stick, CD-ROM, RAM, ROM, etc., or a collection thereof) can be provided (e.g., in communication with the processing arrangement 902). The computer-accessible medium 906 can contain executable instructions 908 thereon. In addition or alternatively, a storage arrangement 910 can be provided separately from the computer-accessible medium 906, which can provide the instructions to the processing arrangement 902 so as to configure the processing arrangement to execute certain exemplary procedures, processes and methods, as described herein above, for example.

Further, the exemplary processing arrangement 902 can be provided with or include an input/output arrangement 914, which can include, for example a wired network, a wireless network, the internet, an intranet, a data collection probe, a sensor, etc. As shown in FIG. 9, the exemplary processing arrangement 902 can be in communication with an exemplary display arrangement 912, which, according to certain exemplary embodiments of the present disclosure, can be a touch-screen configured for inputting information to the processing arrangement in addition to outputting information from the processing arrangement, for example. Further, the exemplary display 912 and/or a storage arrangement 910 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entirety.

[1] "Defense Science Board (DSB) study on High Performance Microchip Supply," http://www.acq.osd.mil/dsb/reports/ADA435563.pdf, 2005.
[2] Bhunia, M. Hsiao, M, Banga, and S. Narasimbhan, "Hardware Trojan Attacks: Threat Analysis and Countermeasures," Proceedings of the IEEE, vol. 102, no. 8, pp. 1229-1247, 2014.
[3] M. Tehranipoor and F. Koushanfar, "A Survey of Hardware Trojan Taxonomy and Detection," IEEE Design and Test of Computers, vol. 27, no. I, pp. 10-25, 2010.
[4] Wikipedia, "Trustworthy computing." [Online]. Available: http://en.wikipedia.org/wiki/Trustworthy_computing#cite_not-0
[5] X. Zhang and M. Tehranipoor, "Case study: Detecting hardware Trojans in third-party digital IP cores," in the Proc. of IEEE International Symposium on Hardware-Oriented Security and Trust, pp. 67-70, 2011.
[6] J. Jou and C. J. Liu, "Coverage analysis techniques for HDL design validation," IEEE Asia Pacific Conference on Chip Design Languages, 1999.
[7] A. Waksman, M. Suozzo, and S. Sethumadhavan, "FANCI: Identification of Stealthy Malicious Logic Using Boolean Functional Analysis," ACM Conference on Computer & Communications Security, pp. 697-708, 2013.
[8] H. Salmani and M. Tehranipoor, "Analyzing circuit vulnerability to hardware Trojan insertion at the behavioral level," IEEE International Symposium on Defect and Fault Tolerance in VLSI and Nanotechnology Systems, pp. 190-195, 2013.
[9] N. G. Tsoutsos, C. Konstantinou, and M. Maniatakos, "Advanced Techniques for Designing Stealthy Hardware Trojans," IEEEIACM Design Automation Conference, pp. 1-4, 2014.
[10] M. R. Rudra, N. A. Daniel, V. Nagoorkar, and D. H. K. Floe, "Designing Stealthy Trojans with Sequential Logic: A Stream Cipher Case Study," in the Proc. of the IEEE/ACM Design Automation Conference, pp. 172:1-172:4, 2014.
[11] E. Love, Y. Jin, and Y. Makris, "Proof-Carrying Hardware Intellectual Property: A Pathway to Trusted Module Acquisition," IEEE Transactions on Information Forensics and Security, vol. 7, no. 1, pp. 25-40, 2012.
[12] M. "Tehranipoor, R. Karri, F. Koushanfar, and M. Potkonjak, "Trusthub," lutp://trust-hub.org.
[13] "NYU-Embedded Systems Challenge," http://isis.poly.edu/esc/.
[14] Y. Liu, Y. Jin, and Y. Makris, "Hardware Trojans in wireless crypto-graphic ICs: Silicon demonstration and detection method evaluation," IEEE/ACM International Conference on Computer-Aided Design, pp. 399-404, 2013.
[15] Y. Jin and Y. Makris, "Hardware Trojans in Wireless Cryptographic ICs," IEEE Design & Test of Computers, vol. 27, no. 1, pp. 26-35, 2010.
[16] L. Lin, W. Burleson, and C. Paar, "MOLES: Malicious off-chip leakage enabled by side-channels," IEEE/ACM International Conference on Computer-Aided Design, pp. 117-122, 2009.
[17] Atmel, "ATSHA204," http://wwreatrnel.com/devices/atsha204.aspx, 2014.
[18] Freescale, "C29x Family of Crypto Coprocessors," http://www.freescale.com/webapp/sps/site/taxonomyjsp?code=C29X-FAMILY&cof=0&am=0, 2014.
[19] J. Woodcock, P. G. Larsen, J. Bicarregui, and J. Fitzgerald, "Formal Methods: Practice and Experience," ACM Computing Surveys, vol. 41, no. 4, pp. 19:1-19:36, 2009.
[20] A. Pnucli, "The temporal semantics of concurrent programs," in Semantics of Concurrent Computation, ser. Lecture Notes in Computer Science, G. Kahn, Ed. Springer Berlin Heidelberg, 1979, vol. 70, pp. 1-20. [Online]. Available: http://dx.doi.org/10.1007/BFb0022460
[21] L. Lampert, "Proving the Correctness of Multiprocess Programs," IEEE Transactions on Software Engineering, vol. SE-3, no. 2, pp. 125-143, 1977.
[22] K. L. McMillan, Symbolic Model Checking. Kluwer Academic Publishers, 1993.
[23] E. Clarke, O. Grumberg, and K. Hamaguchi, "Another Look at I TL Model Checking," Formal Methods in System Design, vol. 10, no. 1, pp. 47-71, 1997.
[24] A. Biere, A. Cimatti, E. Clarke, and Y. Zhu, "Symbolic Model Checking without BDDs," Tools and Algoritlunsjbr the Construction and Analysis of Systems, vol. 1579, pp. 193-207, 1999.
[25] L. Feiten, M. Sauer, T. Schubert, A. Czutro, E. Bohl, I. Polian, and B. Becker, "#SAT-based vulnerability analysis of security components—A Case Study," IEEE International Symposium on Defect and Fault Tolerance in VLSI and Nanotechnology Systems, pp. 49-54, 2012.
[26] H. Eldib, C. Wang, and P. Schaumont. "SMT-Based Verification of Software Countermeasures against Side-Channel Attacks," International Conference on Tools and Algorithms for the Construction and Analysis of Systems, pp. 62-77, 2014.
[27] M. M. Matalgah, W. Zibideh, and A. Magableh, "Alleviating the effect of the strict avalanche criterion (sac) of symmetric-key encryption in wireless communication channels," pp. 138-141, March 2011.
[28] M. R. Rudra, N. A. Daniel, V. Nagoorkar, and D. H. K. Hoe, "Designing Stealthy Trojans with Sequential Logic: A Stream Cipher Case Study," IEEE/ACM Design Automation Conference, pp. 1-4, 2014.
[29] "Cadence: Smv," http://www.cadence.com/products/fv/pages/default.aspx, 2005.
[30] "Defense Science Board (DSB) study on High Performance Microchip Supply," http://www.acq.osd.mil/dsb/reports/ADA435563.pdf, 2005.

[31] S. Bhunia, M. Hsiao, M. Banga, and S. Narasimhan, "Hardware Trojan Attacks: Threat Analysis and Countermeasures," Proceedings of the IEEE, vol. 102, no. 8, pp. 1229-1247, 2014.

[32] M. Tehranipoor and F. Koushanfar, "A Survey of Hardware Trojan Taxonomy and Detection," IEEE Design and Test of Computers, vol. 27, no. 1, pp. 10-25, 2010.

[33] X. Zhang and M. Tehranipoor, "Case study: Detecting hardware Trojans in third-party digital IP cores," IEEE Intentional Symposium on Hardware Oriented Security and Trust, pp. 67-70, 2011.

[34] J. Jou and C. J. Liu, "Coverage analysis techniques for IDL design validation," IEEE Asia Pacific Conference on Chip Design Languages, 1999.

[35] H. Salmani and M. Tehranipoor, "Analyzing circuit vulnerability to hardware Trojan insertion at the behavioral level," IEEE International Symposium on Defect and Fault Tolerance in VLSI and Nanotechnology Systems, pp. 190-195, 2013.

[36] A. Waksman, M. Suozzo, and S. Sethumadhavan, "FANCI: Identification of Stealthy Malicious Logic Using Boolean Functional Analysis," ACM Conference on Computer and Communications Security, pp. 697-708, 2013.

[37] J. Zhang, F. Yuan, L. Wei, Z. Sun, and Q. Xu, "VeriTrust: Verification for hardware trust," IEEE/ACM Design Automation Conference, pp. 1-8, 2013.

[38] J. Zhang, F. Yuan, and Q. Xu, "DeTrust: Defeating Hardware Trust Verification with Stealthy Implicitly-Triggered Hardware Trojans," ACM Conference on Computer and Communications Security, pp. 153-166, 2014.

[39] E. Love, Y. Jin, and Y. Makris, "Proof-Carrying Hardware Intellectual Property: A Pathway to Trusted Module Acquisition," IEEE Trans. on Information Forensics and Security, vol. 7, no. 1, pp. 25-40, 2012.

[40] Y. Jin and Y. Makris, "Proof carrying-based information flow tracking for data secrecy protection and hardware trust," IEEE VLSI Test Symposium, pp. 252-257, 2012.

[41] Y. Jin, et al., "A proof-carrying based framework for trusted microprocessor IP," IEEE/ACM International Conference on Computer-Aided Design, pp. 824-829, 2013.

[42] Jasper, "JasperGold: Security Path Verification App," http://www.jasperda.com/products/jaspergoldapps/security\path\verification\app, 2014.

[43] "Cadence: Smv," http:/www.cadence.com/products/fv/pages/default.aspx, 2005.

[44] M. Tehranipoor, R. Karri, F. Koushanfar, and M. Potkonjak, "Trusthub," http://trusthub.org.

[45] J. Woodcock, P. G. Larsen, J. Bicarregui, and J. Fitzgerald, "Formal Methods: Practice and Experience," ACM Computing Surveys, vol. 41, no. 4, pp. 19:1-19:36, 2009.

[46] A. Pnueli, "The temporal semantics of concurrent programs," Semantics of Concurrent Computation, vol. 70, pp. 1-20, 1979.

[47] A. Biere, A. Cimatti, E. Clarke, and Y. Zhu, "Symbolic Model Checking without BDDs," Tools and Algorithms for the Construction and Analysis of Systems, vol. 1579, pp. 193-207, 1999.

[47] L. Feiten, M. Sauer, T. Schubert, A. Czutro, E. Bohl, I. Polian, and B. Becker, "#SAT-based vulnerability analysis of security components—A Case Study," IEEE International Symposium on Defect and Fault Tolerance in VLSI and Nanotechnology Systems, pp. 49-54, 2012.

[48] H. Eldib, C. Wang, and P. Schaumont, "SMT-Based Verification of Software Countermeasures against Side-Channel Attacks," International Conference on Tools and Algorithms for the Construction and Analysis of Systems, pp. 62-77, 2014.

[49] A. Waksman and S. Sethumadhavan, "Silencing Hardware Backdoors," IEEE Symposium on Security and Privacy, pp. 49-63, 2011.

[50] V. Boppana, S. Rajan, K. Takayama, and M. Fujita, "Model Checking Based on Sequential ATPG," Computer Aided Verification, vol. 1633, pp. 418-430, 1999.

[51] Synopsys, "Tetramax ATPG," http://www.synopsys.com/Tools/Implementation/RTLSynthesis/TestiPages/TetraMAXATPG.aspx, 2014.

[52] Microchip Technology, "PIC16F84A Data sheet," ww1.microchip.com/downloads/en/DeviceDoc/35007b.pdf, 2001.

[53] M. Prasad, P. Chong, and K. Keutzer, "Why is ATPG easy?" IEEE/ACM Design Automation Conference, pp. 22-28, 1999.

What is claimed is:

1. A non-transitory computer-accessible medium having stored thereon computer-executable instructions for determining a presence of at least one Trojan in at least one design of at least one intellectual property (IP) core, wherein, when a computer arrangement executes the instructions, the computer arrangement is configured to perform procedures comprising:
    receiving electronic data related to (i) at least one property and (ii) a hardware description of the at least one design;
    deriving a satisfiability solving engine based on the at least one property and the hardware description using a bounded model checking (BMC) engine;
    generating at least two copies of the at least one design;
    forcing logic contained in each of the at least two copies to at least one particular value; and
    determining the presence of the at least one Trojan by applying the satisfiability solving engine to the at least two copies of the at least one design.

2. The computer-accessible medium of claim 1, wherein the at least one design includes a software description of the at least one design.

3. The computer-accessible medium of claim 1, wherein the determining of the presence of the at least one Trojan includes generating at least one Boolean formula using the BMC engine.

4. The computer-accessible medium of claim 3, wherein the computer arrangement is further configured to assign further particular values to the at least one Boolean formula using a satisfiability solving engine.

5. The computer-accessible medium of claim 4, wherein the computer arrangement is further configured to generate an indication of the presence of the at least one Trojan if the at least one Boolean formula evaluates to 1 using the particular values.

6. The computer-accessible medium of claim 1, further comprising at least one bound.

7. The computer-accessible medium of claim 6, wherein the determining of the presence of the at least one Trojan is further based on the at least one bound.

8. The computer-accessible medium of claim 6, wherein the at least one bound is a particular number of clock cycles.

9. The computer-accessible medium of claim 1, wherein the at least one property includes a detection that the at least one Trojan leaks at least one secret.

10. The computer-accessible medium of claim 9, wherein the at least one secret includes at least one of (i) at least one cryptographic key, (ii) at least one plaintext secret, or (iii) at least one intermediate computation.

11. The computer-accessible medium of claim 1, wherein the at least one property includes a detection that the at least one Trojan leaks at least one subset of at least one secret.

12. The computer-accessible medium of claim 1, wherein the at least one property includes a detection that the at least one Trojan is triggered over a plurality of clock cycles.

13. The computer-accessible medium of claim 1, wherein the at least one property includes a detection of at least one of at least one direct polarity and at least one indirect polarity.

14. The computer-accessible medium of claim 1, wherein the at least one design includes at least one circuit.

15. The computer-accessible medium of claim 1, wherein the computer arrangement is further configured to determine assignments to an input of the at least one design over a plurality of clock cycles using the at least one property.

16. The computer-accessible medium of claim 15, wherein the determining of the presence of the at least one Trojan utilizes a set of inputs over the clock cycles that violate the at least one property.

17. The computer-accessible medium of claim 1, wherein the at least one property includes a strict avalanche criterion property.

18. The computer-accessible medium of claim 17, wherein the computer arrangement is further configured to determine the strict avalanche criterion property.

19. The computer-accessible medium of claim 18, wherein the computer arrangement determines the strict avalanche criterion property using at least two seeds for a pseudo random number generator.

20. The computer-accessible medium of claim 1, wherein the computer arrangement is further configured to generate a plurality of states that satisfy the at least one property using the BMC engine.

21. The computer-accessible medium of claim 20, wherein the computer arrangement determines the presence of the at least one Trojan based on the states.

22. The computer-accessible medium of claim 1, wherein the computer arrangement is further configured to generate at least one witness that violates the at least one property using the BMC engine.

23. The computer-accessible medium of claim 22, wherein the computer arrangement determines the presence of the at least one Trojan based on the at least one witness.

24. The computer-accessible medium of claim 1, wherein the computer arrangement is further configured to generate at least one temporal logic design of the at least one design using the BMC checking engine.

25. The computer-accessible medium of claim 24, wherein the computer arrangement is further configured to determine the presence of the at least one Trojan based on the at least one temporal logic design.

26. The computer-accessible medium of claim 1, wherein the computer arrangement is further configured to (i) force the logic contained in a first copy of the at least two copies to a logic 0, and (ii) force the logic contained in a second copy of the at least two copies to a logic 1.

27. A method for determining a presence of at least one Trojan in at least one design of at least one intellectual property (IP) core, comprising:
receiving electronic data related to (i) at least one property and (ii) a hardware description of the at least one design;
deriving a satisfiability solving engine based on the at least one property and the hardware description using a bounded model checking (BMC) engine;
generating at least two copies of the at least one design;
forcing logic contained in each of the at least two copies to at least one particular value; and
determining the presence of the at least one Trojan by applying the satisfiability solving engine to the at least two copies of the at least one design.

28. A system for determining a presence of at least one Trojan in at least one design of at least one intellectual property (IP) core, comprising:
a computer hardware arrangement configured to:
receive electronic data related to (i) at least one property and (ii) a hardware description of the at least one design;
derive a satisfiability solving engine based on the at least one property and the hardware description using a bounded model checking (BMC) engine;
generate at least two copies of the at least one design;
force logic contained in each of the at least two copies to at least one particular value; and
determine the presence of the at least one Trojan by applying the satisfiability solving engine to the at least two copies of the at least one design.

29. The method of claim 27, wherein (i) the logic contained in a first copy of the at two copies is forced to a logic 0, and (ii) the logic contained in a second copy of the at least two copies is forced to a logic 1.

30. The system of claim 28, wherein the computer hardware arrangement is configured to (i) force the logic contained in a first copy of the at least two copies to a logic 0, and (ii) force the logic contained in a second copy of the at least two copies to a logic 1.

* * * * *